United States Patent
Yano

(10) Patent No.: US 9,521,361 B2
(45) Date of Patent: *Dec. 13, 2016

(54) CONFERENCE DEVICE

(71) Applicant: RICOH COMPANY, LTD., Tokyo (JP)

(72) Inventor: Ryota Yano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,758

(22) Filed: Feb. 4, 2015

(65) Prior Publication Data

US 2015/0146095 A1   May 28, 2015

Related U.S. Application Data

(63) Continuation of application No. 13/448,672, filed on Apr. 17, 2012, now Pat. No. 8,976,958.

(30) Foreign Application Priority Data

Apr. 28, 2011   (JP) .................................. 2011-101711

(51) Int. Cl.
*H04M 1/00*   (2006.01)
*H04N 7/14*   (2006.01)
(Continued)

(52) U.S. Cl.
CPC .............. *H04N 7/142* (2013.01); *H04M 1/02* (2013.01); *H04M 1/2535* (2013.01);
(Continued)

(58) Field of Classification Search
CPC ....... H04M 1/02; H04M 1/2535; H04N 7/142; H04N 7/147; H04N 7/15; H04N 5/2252
See application file for complete search history.

(56) References Cited

U.S. PATENT DOCUMENTS 5,280,540 A   1/1994   Addeo et al.
5,400,068 A   3/1995   Ishida et al.
(Continued)

FOREIGN PATENT DOCUMENTS

CN   1551595 A   12/2004
CN   101120558 A   2/2008
(Continued)

OTHER PUBLICATIONS

Office Action mailed Aug. 21, 2013, in co-pending U.S. Appl. No. 13/222,312.

(Continued)

*Primary Examiner* — Simon Sing
(74) *Attorney, Agent, or Firm* — Oblon, McClelland, Maier & Neustadt, L.L.P.

(57) ABSTRACT

A conference device receives and transmits at least one of images and voice via a communication network. The conference device includes a housing having an upper wall; and an operating unit installed on the upper wall. The operating unit includes a first operating member group made up of a plurality of operating members, and at least one different operating member that has a lower frequency of usage as compared to each of the plurality of operating members of the first operating member group. The plurality of operating members of the first operating member group are arranged in a first direction along a top face of the upper wall. The at least one different operating member is disposed, along with one of the plurality of operating members of the first operating member group, in a second direction that runs along the top face and that intersects with the first direction.

9 Claims, 14 Drawing Sheets

(51) Int. Cl.
*H04M 1/02* (2006.01)
*H04M 1/253* (2006.01)
*H04N 7/15* (2006.01)
*H04N 5/225* (2006.01)
*H04L 12/18* (2006.01)

(52) U.S. Cl.
CPC ........... *H04N 5/2252* (2013.01); *H04N 7/147* (2013.01); *H04N 7/15* (2013.01); *H04L 12/1822* (2013.01); *H04N 2007/145* (2013.01)

(56) References Cited

U.S. PATENT DOCUMENTS

| | | | |
|---|---|---|---|
| 5,400,393 | A | 3/1995 | Knuth et al. |
| 5,489,938 | A | 2/1996 | Maruyama et al. |
| 6,049,290 | A * | 4/2000 | Halstead ............. 340/7.63 |
| 6,177,950 | B1 | 1/2001 | Robb |
| 6,266,410 | B1 | 7/2001 | Takahashi et al. |
| 6,411,332 | B1 | 6/2002 | Whitby et al. |
| 6,636,606 | B1 * | 10/2003 | Lissner ............. H04M 1/23 379/451 |
| 6,904,298 | B2 | 6/2005 | Arai et al. |
| 6,914,774 | B1 * | 7/2005 | Albertini ............. G06F 1/1626 345/156 |
| 6,976,626 | B2 * | 12/2005 | Schmidt et al. ......... 235/462.01 |
| 6,977,811 | B1 * | 12/2005 | Fleck et al. ............. 361/679.18 |
| 7,231,229 | B1 * | 6/2007 | Hawkins et al. ............. 455/564 |
| 7,336,775 | B2 | 2/2008 | Tanaka et al. |
| 7,343,568 | B2 * | 3/2008 | Jiang et al. ............. 715/854 |
| 7,456,759 | B2 | 11/2008 | Griffin et al. |
| 7,540,205 | B2 * | 6/2009 | Nelson et al. ............. 73/864.11 |
| 7,671,841 | B2 | 3/2010 | Lee et al. |
| 7,710,497 | B2 | 5/2010 | Sukenari et al. |
| 7,880,729 | B2 * | 2/2011 | Lynch ............. G06F 3/0202 345/156 |
| 7,929,050 | B2 | 4/2011 | Liang et al. |
| 8,106,883 | B2 * | 1/2012 | Ahn ............. 345/158 |
| 2004/0002356 | A1 * | 1/2004 | Honda ............. G06F 3/0338 455/550.1 |
| 2004/0267990 | A1 | 12/2004 | Lin |
| 2005/0069107 | A1 | 3/2005 | Tanaka et al. |
| 2006/0209810 | A1 | 9/2006 | Krzyzanowski et al. |
| 2007/0107163 | A1 | 5/2007 | Barnett |
| 2008/0015717 | A1 * | 1/2008 | Griffin, Jr. ............. H02J 7/0042 700/94 |
| 2008/0259590 | A1 * | 10/2008 | De Goederen ............. 362/85 |
| 2008/0266270 | A1 * | 10/2008 | Nakamura ............. G06F 1/1616 345/173 |
| 2010/0052938 | A1 * | 3/2010 | Otsuka ............. G08C 17/02 340/12.22 |
| 2010/0188549 | A1 | 7/2010 | Ichieda |
| 2010/0193341 | A1 | 8/2010 | Uotani |
| 2010/0289906 | A1 | 11/2010 | Kaye et al. |
| 2011/0050579 | A1 * | 3/2011 | Takahashi ............. G06F 3/0236 345/168 |
| 2011/0205154 | A1 * | 8/2011 | Lowles ............. G06F 1/169 345/157 |

FOREIGN PATENT DOCUMENTS

| | | |
|---|---|---|
| CN | 101460913 A | 6/2009 |
| CN | 201638211 U | 11/2010 |
| EP | 0 836 324 A2 | 4/1998 |
| JP | 5-30502 | 2/1993 |
| JP | 5-64188 | 3/1993 |
| JP | 8-51611 | 2/1996 |
| JP | 9-205629 | 8/1997 |
| JP | 10-285569 A | 10/1998 |
| JP | 3045390 | 3/2000 |
| JP | 2000-244608 | 9/2000 |
| JP | 2002-182834 | 6/2002 |
| JP | 2004-72420 A | 3/2004 |

OTHER PUBLICATIONS

Office Action mailed Dec. 2, 2013, in co-pending U.S. Appl. No. 14/113,712.

Office Action mailed Dec. 20, 2012, in co-pending U.S. Appl. No. 13/337,727.

Office Action mailed Jun. 10, 2013, in co-pending U.S. Appl. No. 13/337,727.

Combined Office Action and Search Report issued Apr. 17, 2014 in Chinese Patent Application No. 2012102280008 (with English translation).

Office Action issued Jan. 4, 2015, in Chinese Patent Application No. 2012102280008 (with English-language translation).

Chinese Office Action dated Dec. 1, 2015, issued in Chinese Patent Application No. 201280020586.7 (with English translation).

* cited by examiner

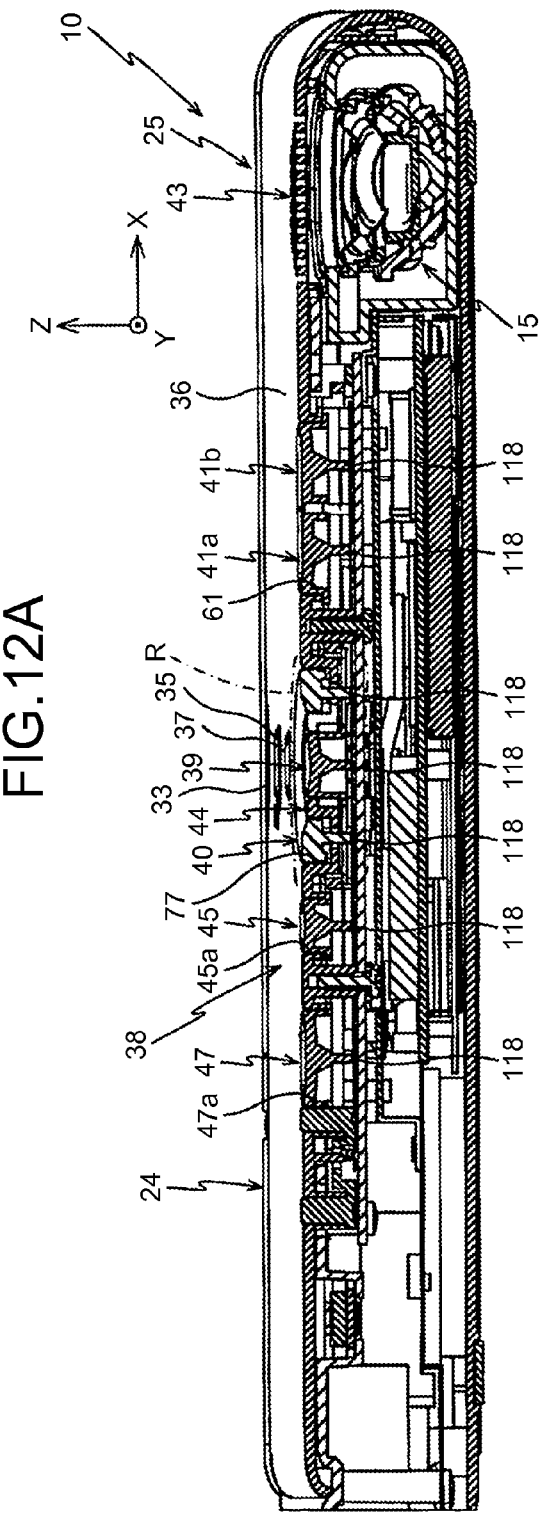
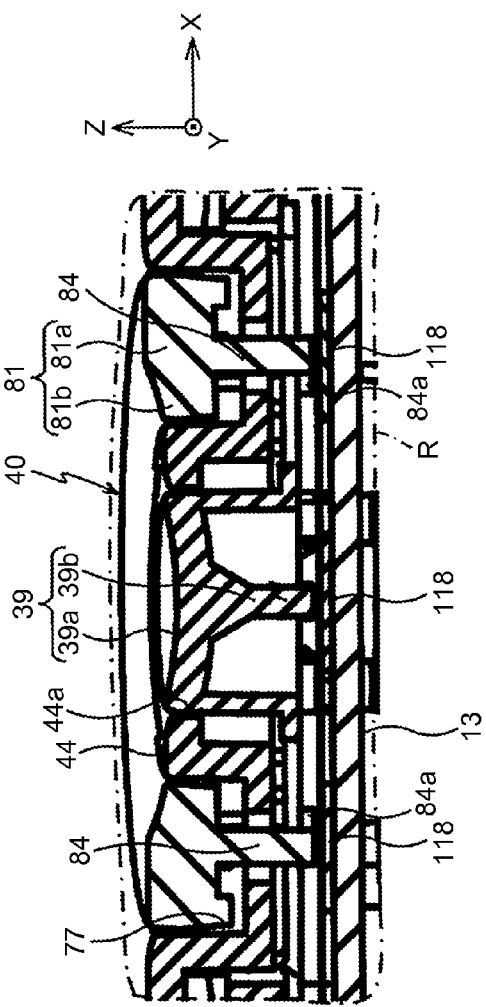
FIG.12A
FIG.12B

US 9,521,361 B2

CONFERENCE DEVICE

CROSS-REFERENCE TO RELATED APPLICATIONS

The present application is a continuation application of and claims the benefit of priority under 35 U.S.C. §120 from U.S. application Ser. No. 13/448,672, filed Apr. 17, 2012, which is based upon and claims the benefit of priority under 35 U.S.C. §119 from Japanese Patent Application No. 2011-101711 filed in Japan on Apr. 28, 2011, the entire contents of both of which are incorporated herein by reference.

BACKGROUND OF THE INVENTION

1. Field of the Invention

The present invention relates to a conference device.

2. Description of the Related Art

Typically, a video teleconference session or a telephone conference session is carried out in which two-way communication of at least one of images and voice is performed via a communication network (such as the Internet or a telephone line) among a plurality of groups with the use of a plurality of conference devices.

During such a video teleconference session (or a telephone conference session), a plurality of operating members that are arranged in an operating unit of each conference device is operated by the corresponding group members with the aim of, for example, starting the conference device or implementing functions specific to the operating members to perform various settings (for example, see Japanese Patent Laid-open Application No. 2000-244608).

However, for example, in the conference device disclosed in Japanese Patent Laid-open Application No. 2000-244608, a plurality of operating members is arranged in a casual manner without taking into account the user-friendliness of the operating unit.

Therefore, there is a need for a conference device that includes an operating unit with excellent user-friendliness.

SUMMARY OF THE INVENTION

It is an object of the present invention to at least partially solve the problems in the conventional technology.

According to an embodiment, there is provided a conference device for receiving and transmitting at least one of images and voice via a communication network. The conference device includes a housing having an upper wall; and an operating unit installed on the upper wall. The operating unit includes a first operating member group made up of a plurality of operating members, and at least one different operating member that has a lower frequency of usage as compared to each of the plurality of operating members of the first operating member group. The plurality of operating members of the first operating member group are arranged in a first direction along a top face of the upper wall. The at least one different operating member is disposed, along with one of the plurality of operating members of the first operating member group, in a second direction that runs along the top face and that intersects with the first direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12A is a cross-sectional view along line B-B illustrated in FIG. 3;

FIG. 12B is a partially enlarged view of the video teleconference device illustrated in FIG. 12;

DETAILED DESCRIPTION OF THE PREFERRED EMBODIMENTS

Figure 1A:
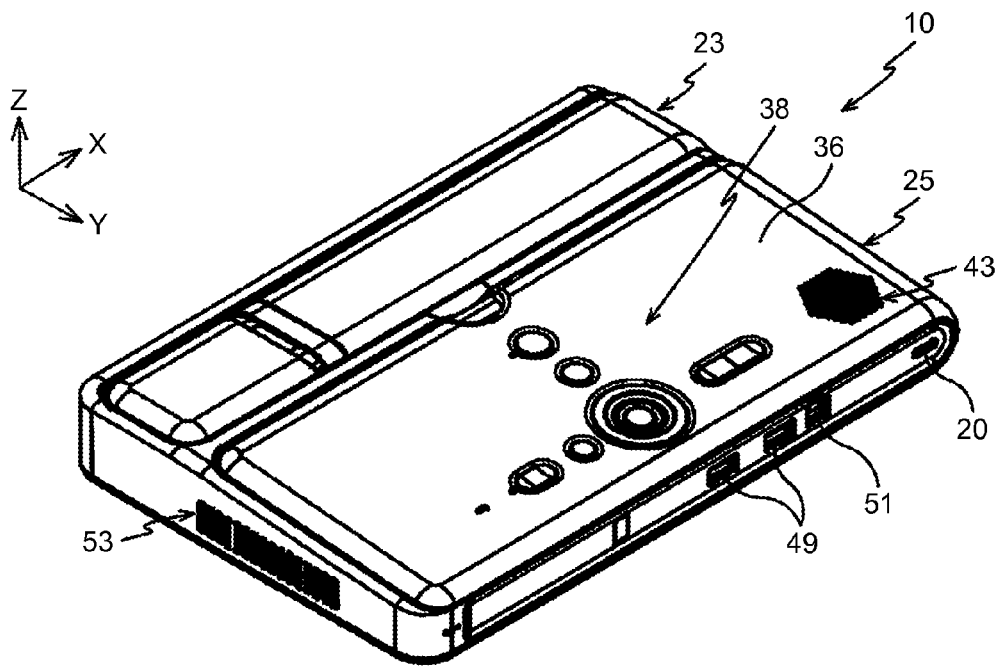
FIGS. 1A and 1B are perspective views of an external appearance, in an unused state, of a video teleconference device according to an embodiment of the present invention.
Figure 1B:
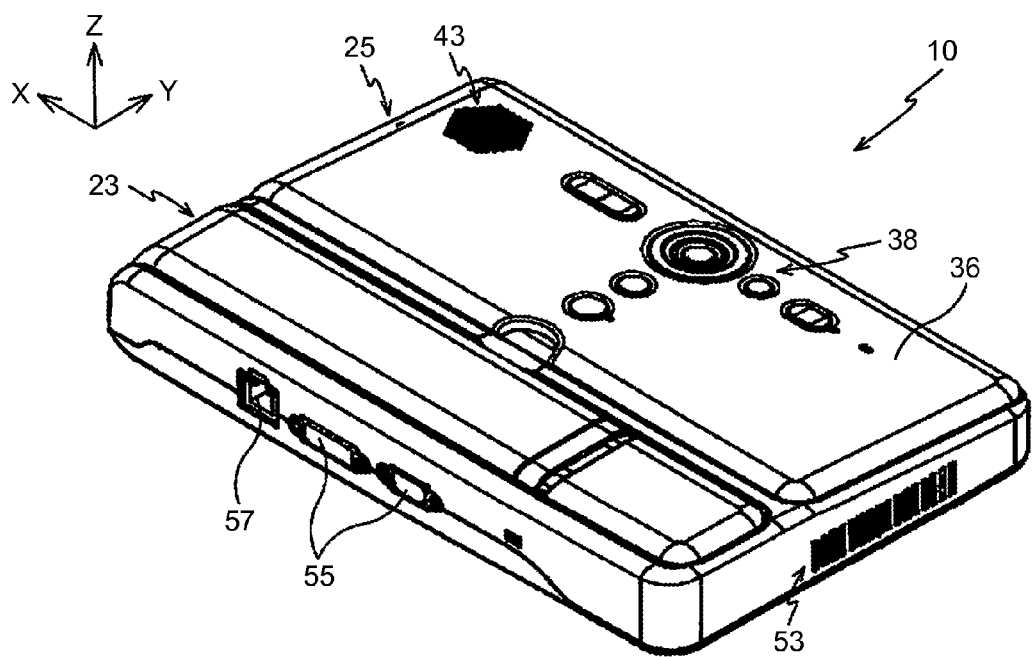

An exemplary embodiment of the present invention is described in detail below with reference to FIGS. 1A to 14. FIGS. 1A and 1B illustrate an external appearance, in an unused state, of a video teleconference device serving as a conference device according to the present embodiment. As illustrated in FIGS. 1A and 1B, in the unused state, a video teleconference device 10 in entirety has the outer shape of a thin and substantially rectangular parallelepiped (substantially flat plate). In FIGS. 1A and 1B, the video teleconference device 10 is placed along the horizontal plane on, for example, the top face (mounting face) of a desk or a table. In the following explanation, it is assumed that the longitudinal direction of the video teleconference device 10 is the X-axis direction; it is assumed that the direction orthogonal to the X-axis direction within the horizontal plane is the Y-axis direction; and it is assumed that the direction orthogonal to the X-axis direction and the Y-axis direction (i.e., the vertical direction) is the Z-axis direction.

Figure 2:
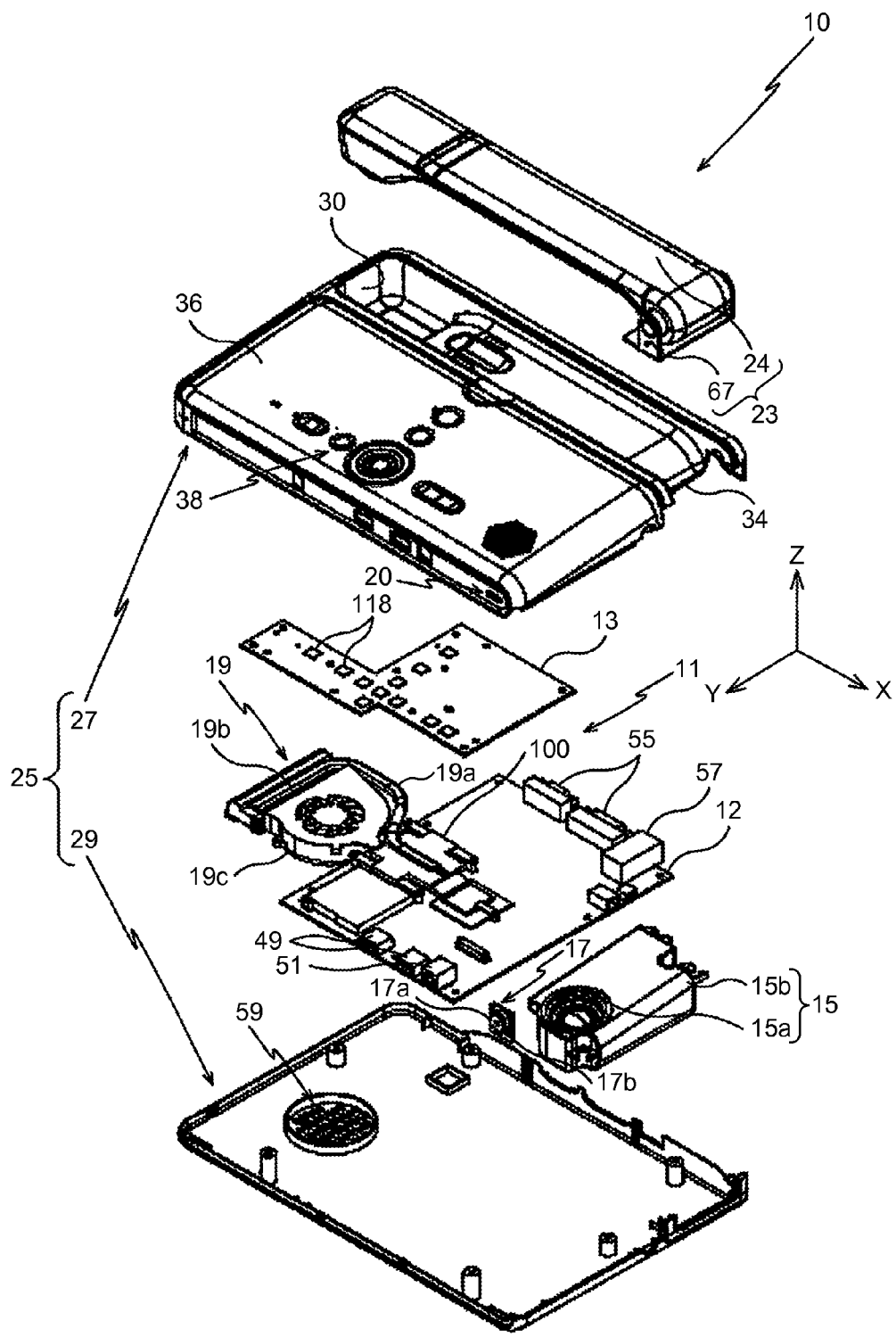
FIG. 2 is an exploded perspective view of the video teleconference device according to the embodiment.

FIG. 2 is an exploded perspective view of the video teleconference device 10 illustrated in FIG. 1. As illustrated in FIG. 2, the video teleconference device 10 includes a housing 25; a control device 11; a voice output device 15 equipped with a speaker 15a; a voice input device 17 equipped with a microphone 17a; a cooling system 19; an image input device 23 equipped with an electronic camera 21 (see FIG. 7); and an operating unit 38.

Figure 3:
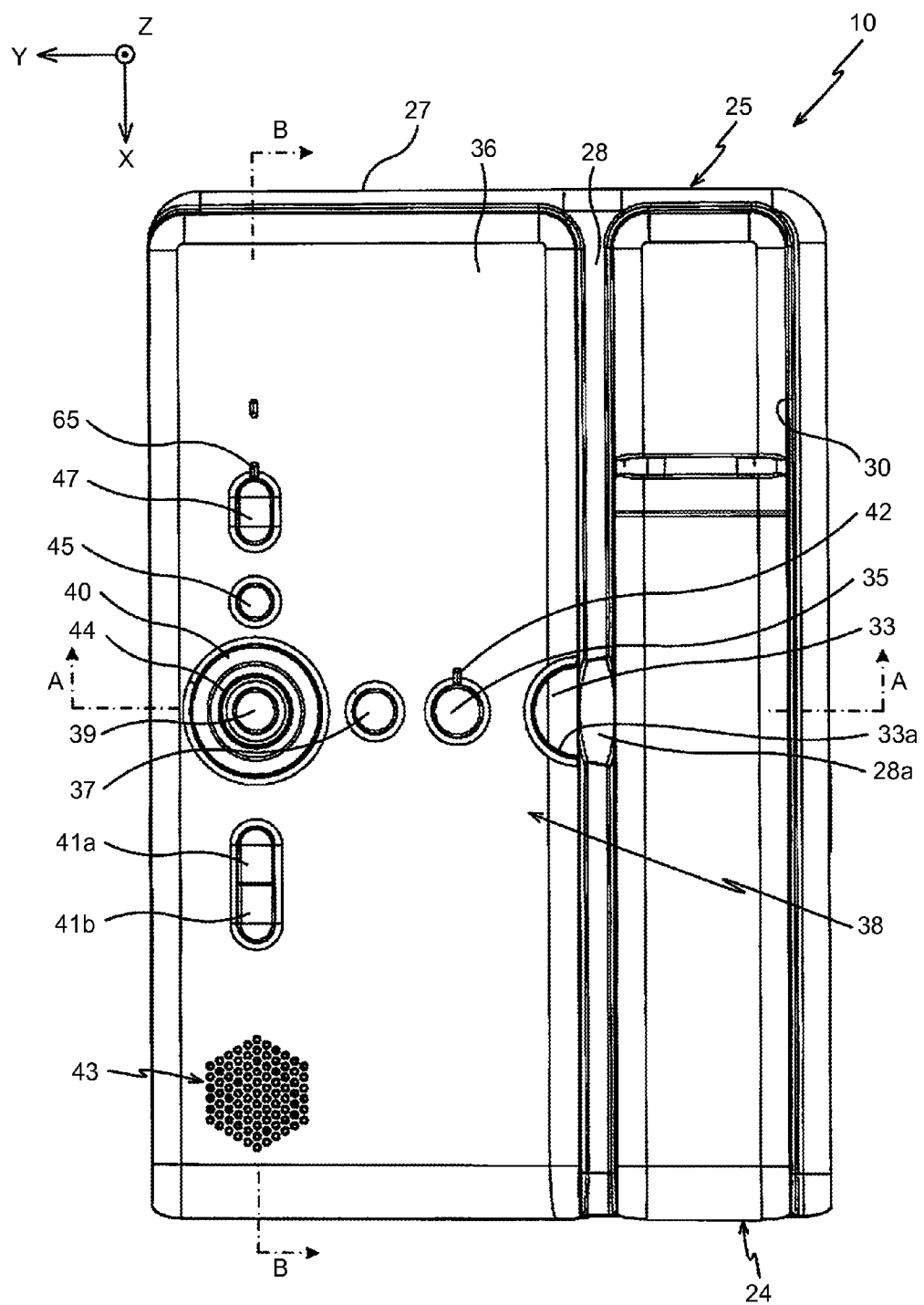
FIG. 3 is a top view of the video teleconference device according to the embodiment.
Figure 4:
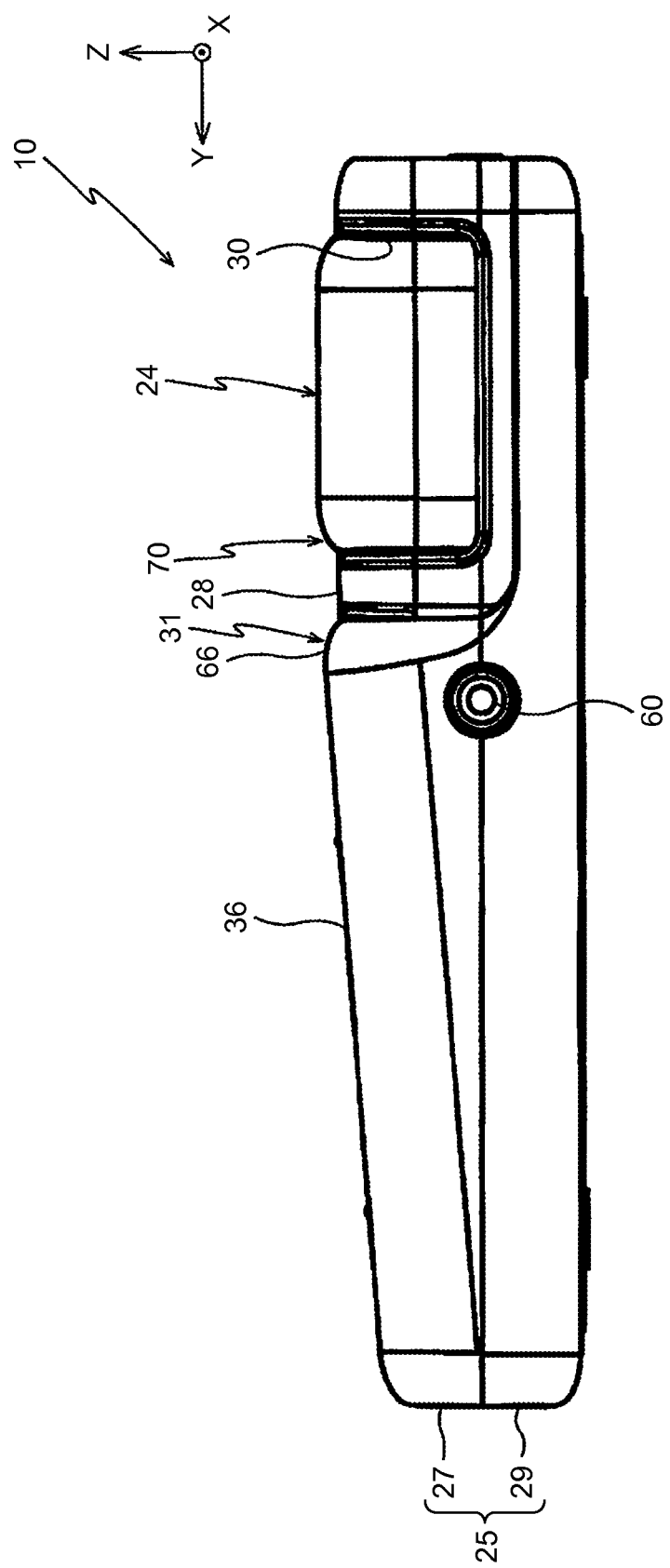
FIG. 4 is one side view of the video teleconference device according to the embodiment.
Figure 5:
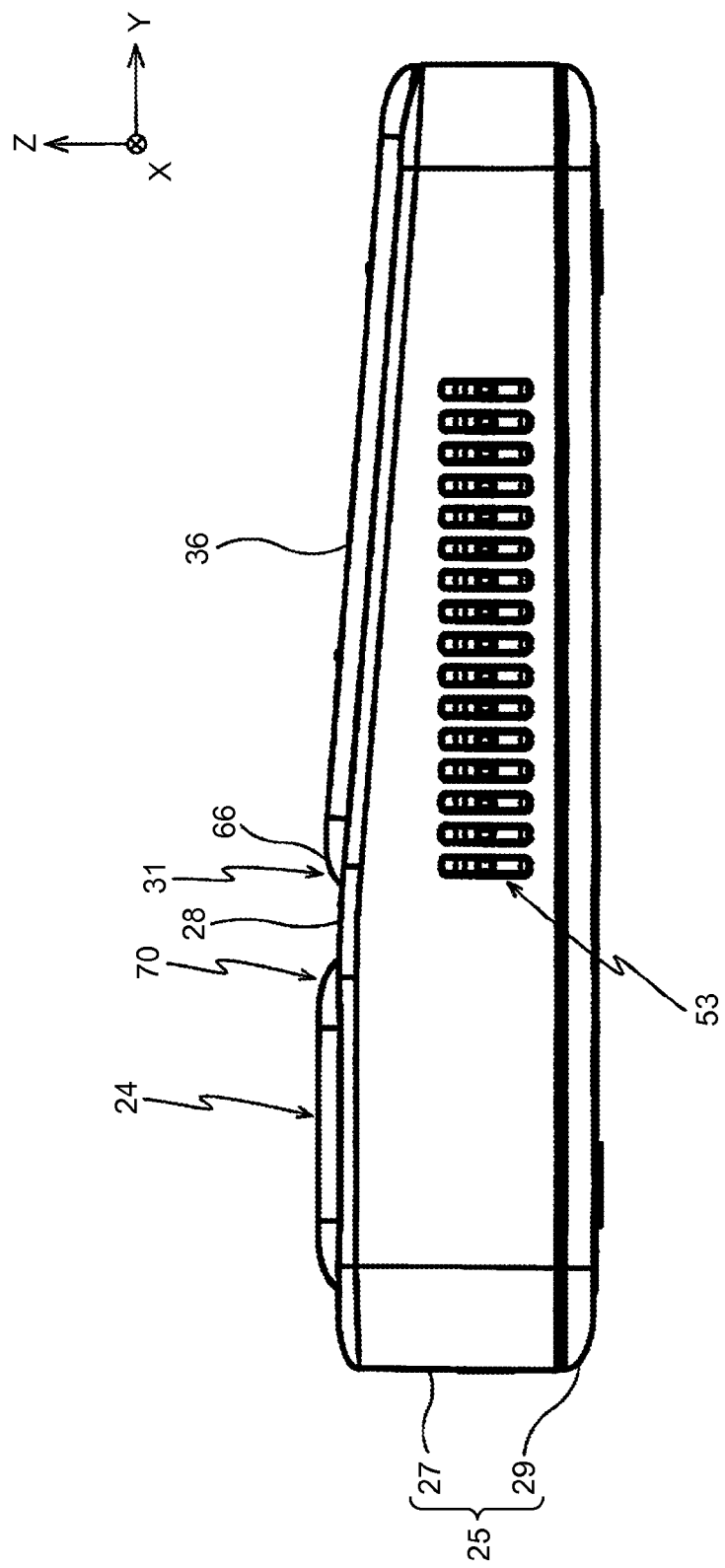
FIG. 5 is the other side view of the video teleconference device according to the embodiment.

The housing 25 is a thin box-like hollow member (having the shape of a substantially rectangular parallelepiped). As illustrated in FIG. 3, in a planar view, the housing 25 has the outer shape of, for example, an almost A4-sized rectangle. As illustrated in FIGS. 4 and 5, the housing 25 has a roughly constant thickness (of, for example, 15 mm to 45 mm).

As illustrated in FIG. 2, the housing 25 includes an upper cover 27 and a lower cover 29 that are joined together with, for example, screws in a detachable manner in the thickness direction (in FIG. 2, the vertical direction). The upper cover 27 is formed in a thin box shape having the side in the −Z direction open. The lower cover 29 is formed in a thin box shape having the side in the +Z direction open.

As illustrated in FIG. 2, in the vicinity of the end on the side in the −Y direction of the upper wall of the upper cover 27 (i.e., the upper wall of the housing 25), a concave portion 30 is formed that extends over almost the entire area in the X-axis direction and that is open on the sides in the +Z direction and the +X direction of a planar rectangle having the X-axis direction as the longitudinal direction. A cut 34 is taken at the end on the side in the +X direction of the bottom face that defines the concave portion 30.

As illustrated in FIG. 3, on the upper wall of the upper cover 27 (i.e., the upper wall of the housing 25), an operation panel 36 having the operating unit 38 is disposed on the side in the +Y direction of the concave portion 30. The operation panel 36 accounts for almost the entire area in the X-axis direction of the upper wall of the housing 25 and accounts for almost two-thirds of the area in the Y-axis direction of the upper wall of the housing 25. The details regarding the operation panel 36 and the operating unit 38 are given later.

As illustrated in FIG. 1A, in the middle part in the X-axis direction of the side wall in the +Y direction (i.e., on the front wall) of the housing 25 are fit a Universal Serial Bus (USB) terminal 49, which is used in performing input-output operations with respect to a storage medium such as a flash memory or with respect to an external device, and a USB terminal 51, which is used in establishing a connection with a personal computer (hereinafter, referred to as "PC"). The USB terminals 49 and 51 are mounted on a main board 12 (described later).

As illustrated in FIG. 1B, on the side wall in the −Y direction (i.e., on the rear wall) of the housing 25 are fit an image output terminal 55 and a local area network (LAN) terminal 57 for communication. The image output terminal 55 and the LAN terminal 57 are mounted on the main board 12 (described later). As illustrated in FIG. 4, in the side wall in the +X direction of the housing 25, a power jack 60 is fit in.

As illustrated in FIG. 3, at the corner between the sides in the +X direction and the +Y direction of the operation panel 36, a voice discharging opening 43 is formed from a plurality of through holes. The voice discharging opening 43 discharges the sound that is output by the speaker 15*a* to the outside.

As illustrated in FIG. 2, at the end on the side in the +X direction of the side wall in the +Y direction (i.e., on the front wall) of the housing 25, a voice incorporating opening 20 is formed from a plurality of through holes. The voice incorporating opening 20 incorporates the voice that is input from the microphone 17*a*.

As illustrated in FIG. 5, in the middle part in the Y-axis direction of the side wall in the −X direction of the housing 25, an exhaust outlet 53 is formed from a number of slit-like through holes that extend in the Z-axis direction and that are arranged in the Y-axis direction.

As illustrated in FIG. 2, in the vicinity of the end on the side in the −X direction of the lower wall of the lower cover 29 (i.e., the lower wall of the housing 25), an air inlet 59 is formed from a number of through holes.

The control device 11 performs encoding/decoding of voice data and image data, and controls two-way communication of voice and images via the Internet that serves as the communication network.

The control device 11 includes the main board 12 serving as a control board and includes a sub-board 13 serving as a board for voice processing and a board for operations.

Figure 6:
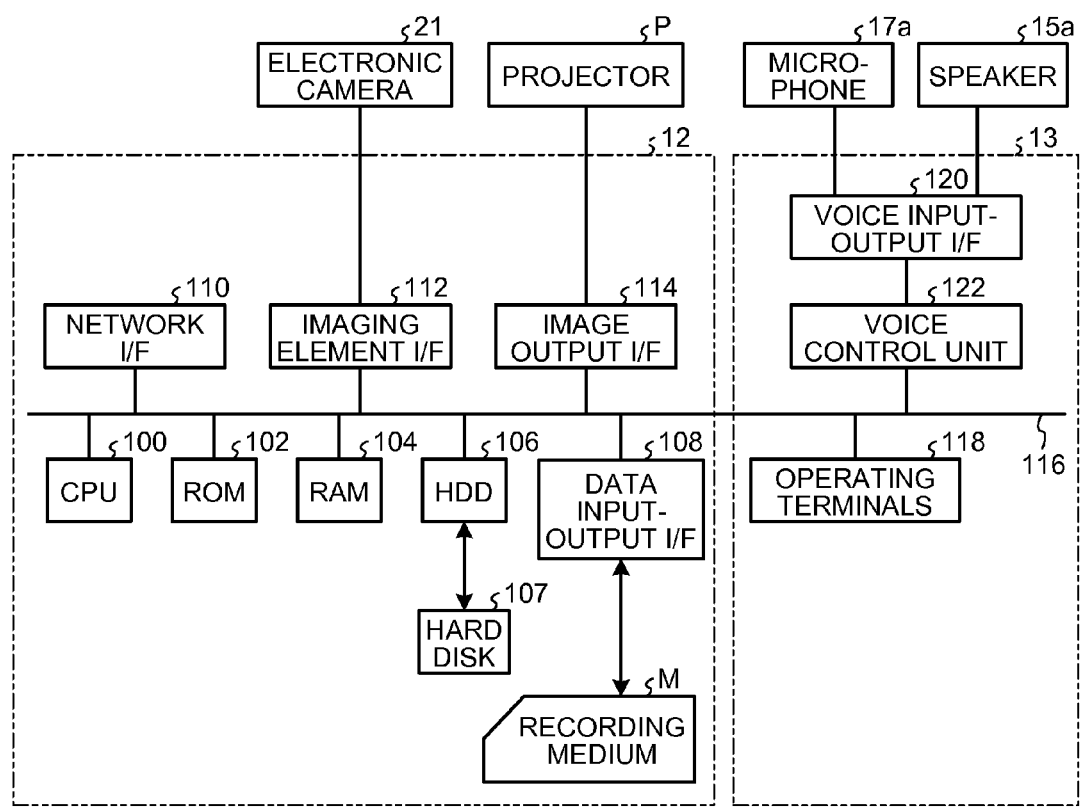
FIG. 6 is a block diagram of a configuration for controlling the video teleconference device according to the embodiment.

As illustrated in FIG. 6, on the main board 12; a central processing unit (CPU) 100, a read only memory (ROM) 102, a random access memory (RAM) 104, a hard disk drive (HDD) 106 (or a storage device or a recording device), a data input-output interface (I/F) 108, a network interface (I/F) 110, an imaging element interface (I/F) 112, and an image output interface (I/F) 114 are mounted in a two-way communicable manner via a bus line 116 of address buses and data buses. Meanwhile, the abovementioned image data points to the data of intermittent images (i.e., still images captured at fixed time intervals).

The CPU 100 controls the operations of the entire video teleconference device 10 based on a predetermined computer program (a video teleconference device program). Explained later is a sequence of operations for performing two-way communication of voice and images via the Internet based on the instructions issued by the CPU 100 according to the video teleconference device program. The ROM 102 is used to store computer programs such as the initial program loader (IPL) that is implemented for driving the CPU 100. The RAM 104 is used as a work area for the CPU 100.

The HDD 106 is used to store the abovementioned video teleconference device program and a variety of data such as image data and voice data. Meanwhile, instead of an HDD, it is also possible to use a solid state drive (SSD). The abovementioned video teleconference device program can be distributed in the form of an installable or executable file on a computer-readable storage medium. Moreover, the abovementioned video teleconference device program can be stored not in the HDD 106 but in the ROM 102. Under the control of the CPU 100, the HDD 106 controls reading and writing of data performed with respect to a hard disk 107.

The data input-output I/F 108 includes the USB terminals 49 and 51 mentioned above. The data input-output I/F 108 controls reading or writing of data with respect to a storage medium M such as a flash memory that is connected to the USB terminal 49; as well as controls the transmission of data, which is displayed on the display of the PC connected to the USB terminal 51, to another conference device.

The storage medium M is detachably attached to the USB terminal 49. Moreover, if the storage medium M is a nonvolatile memory that, under the control of the CPU 100, performs reading or writing of data; then it is also possible to use an electronically erasable and programmable ROM (EEPROM) in place of a flash memory.

The network I/F 110 includes the LAN terminal 57 mentioned above (for example, an Ethernet (registered trademark) terminal), and performs input-output of data (image data and video data) via the Internet. The imaging element I/F 112 incorporates image signals, which are output by the electronic camera 21, in the form of predetermined image data. Meanwhile, the details of the image input device 23 equipped with the electronic camera 21 are given later.

The image output I/F 114 includes the image output terminal 55 mentioned above and outputs the following types of data: a menu screen containing operation icons regarding addresses of other conference devices with which a video teleconference session may be planned, regarding image quality adjustment of other conference devices, or regarding selection of output signals; encoded image data from among the data received via the communication network; and image data input from the electronic camera 21. Regarding the output of such data, the image output I/F 114 converts that data into predetermined analog or digital signals that are receivable by a display device such as a liquid crystal monitor, a liquid crystal television, a PC, or a projector P (see FIG. 14). Meanwhile, the task of decoding the encoded image data using a predetermined codec is performed by the CPU 100. Herein, the predetermined image signals may include analog RGB signals (VGA), component video signals, High-Definition Multimedia Interface (HDMI) signals, or Digital Video Interactive (DVI) signals.

On the sub-board 13 are mounted various constituent elements such as a plurality of operating terminals 118, a voice input-output interface (I/F) 120, and a voice control unit 122 that individually correspond to a plurality of operating members included in the operating unit 38 (described later). The operating terminals 118 and the voice control unit 122 are connected to each other in a two-way communicable manner via the bus line 116, as well as connected to the constituent elements mounted on the main board 12 in a two-way communicable manner.

The voice input-output I/F 120 incorporates voice signals, which are input from the microphone 17a, as predetermined voice data and sends that voice data to the voice control unit 122. Moreover, the voice input-output I/F 120 converts voice data, which is received via the network I/F 110 and the voice control unit 122, into voice signals that are reproducible in the speaker 15a. Meanwhile, the details regarding the voice input device 17 equipped with the microphone 17a and the details regarding the voice output device 15 equipped with the speaker 15a are given later.

When a pair of Volume buttons 41a and 41b (described later) is pressed, the voice control unit 122 adjusts the volume level output from the speaker 15a. Moreover, when a Microphone mute button 47 (described later) is pressed (i.e., switched on or switched off); the voice control unit 122 switches between input/no-input of voice from the microphone 17a.

Furthermore, the voice control unit 122 is also equipped with an echo cancelling function for curbing the echo effect or the howling effect that may occur when, during two-way communication with another video teleconference device, the voice output from the speaker 15a gets input from the microphone 17a thereby forming a loop of sound waves. Besides, the voice control unit 122 also has a noise cancelling function for reducing noise, such as the sound of air conditioning or the operating sound of a fan 19c (described later), that gets input from the microphone 17a.

As illustrated in FIG. 2, the voice output device 15 includes the speaker 15a as well as includes a speaker box 15b that is a box-like hollow member. Herein, as the speaker 15a, for example, a round-shaped full range type speaker is used. However, a speaker of any other type can also be used. The speaker 15a is connected to the voice input-output I/F 120 by means of wire connection, and outputs the voice signals, which are transmitted by the voice input-output I/F 120, as voice (see FIG. 6). The speaker 15a is fit in at the top panel of the speaker box 15b so that the voice outputting direction of the speaker 15a is roughly upward (including obliquely upward). The speaker box 15b is placed at the end on the side in the +X direction of the housing 25. As a result, the speaker 15a gets positioned directly beneath the voice discharging opening 43.

The voice input device 17 includes the microphone 17a as well as includes a holding member 17b that holds the microphone 17a on the housing 25. Herein, as the microphone 17a, for example, a compact omnidirectional microphone is used. Instead, it is also possible to use a directional microphone. The microphone 17a is connected to the voice input-output I/F 120 by means of wire connection, and transmits the voice, which is input thereto as voice signals, to the voice input-output I/F 120 (see FIG. 6). The microphone 17a is held on the housing 25 via the holding member 17b at a position adjoining the voice incorporating opening 20 formed in the housing 25. As a result, the voice input direction of the microphone 17a is roughly in the −Y direction.

The cooling system 19 cools a heating element, such as the CPU 100 mounted on the main board 12 of the control device 11, by releasing the heat generated by that heating element to the outside of the housing 25. For that, the cooling system 19 has a configuration described below.

As illustrated in FIG. 2, the cooling system 19 includes a heat pipe 19a, a heat sink 19b, and the transverse-mounted fan 19c.

For example, one end of the heat pipe 19a is connected to the CPU 100, the other end of the heat pipe 19a is connected to the heat sink 19b, and the middle part of the heat pipe 19a extends along the XY plane. The heat sink 19b is made of, for example, a heat dissipating member that includes a plurality of metallic fins arranged at predetermined intervals in the Y-axis direction. The heat sink 19b is positioned adjoining the exhaust outlet 53 formed in the housing 25 (see FIG. 5). Thus, the heat generated by, for example, the CPU 100 reaches the heat pipe 19a and the heat sink 19b in that order, and is then released through the exhaust outlet 53 to the outside of the housing 25.

The fan 19c has an air deflecting function and is positioned immediately above the air inlet 59 formed in the housing 25. Thus, it is ensured that, in the vicinity on the side in the +X direction of the heat sink 19b, the air inlet direction is roughly in the +Z direction and the air outlet direction is roughly in −X direction.

Thus, the air taken in by the fan 19c through the air inlet 59 is passed through the heat sink 19b and released to the outside of the housing 25 through the exhaust outlet 53. That enhances the effect of discharging (diffusing) the heat from the heat sink 19b.

Figure 7:
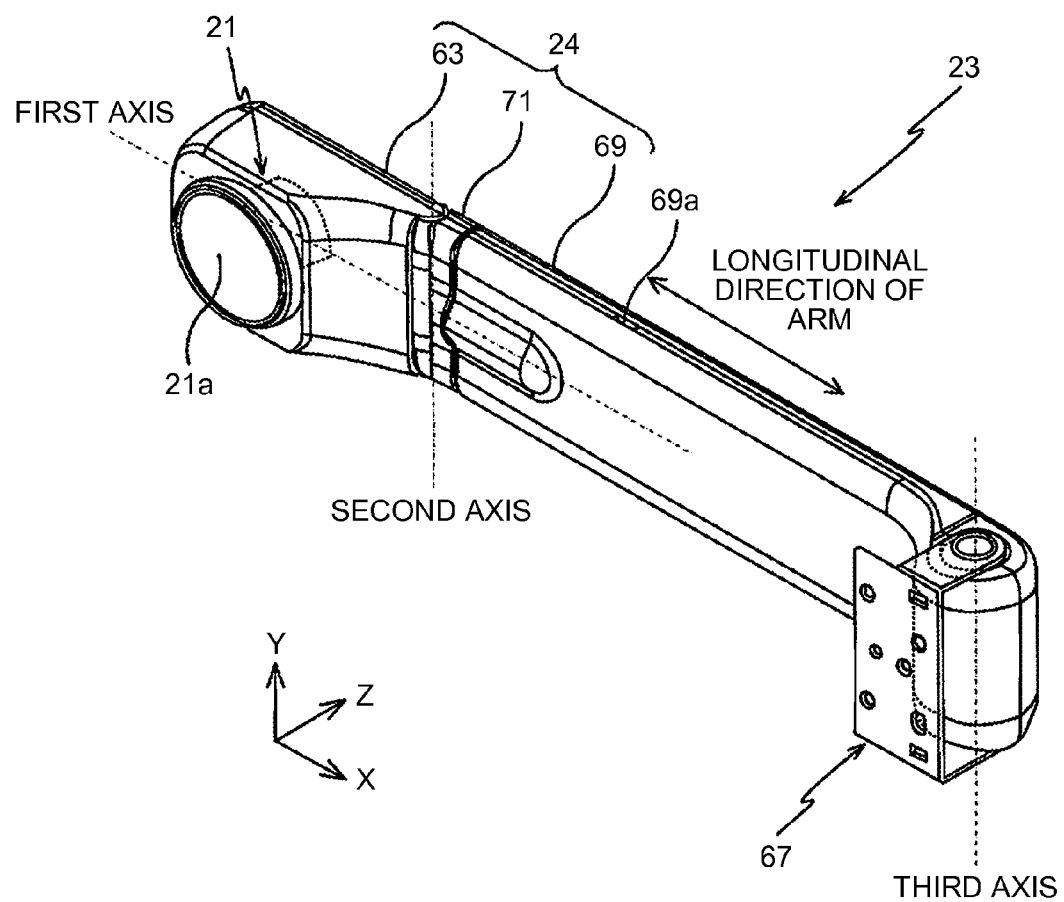
FIG. 7 is a perspective view of an image input device included in the video teleconference device according to the embodiment.

As illustrated in FIG. 7, the image input device 23 includes the electronic camera 21 as well as includes an arm 69 and a uniaxial hinge device 67.

The electronic camera 21, which constitutes the image input device 23, receives input of images of a photographic subject via a photographing lens 21a, converts the received images into electric signals, and outputs the electric signals to the imaging element I/F 112 (see FIG. 6). In a camera housing 63 that is a hollow member, the electronic camera 21 is housed with the photographing lens 21a being exposed to the outside. As the photographing lens 21a, for example, a single-focus wide-angle lens having a short focal length is used. The camera housing 63 is attached to the leading end (i.e., one end in the longitudinal direction) of the arm 69 via a biaxial hinge device (not illustrated). With respect to the arm 69, the camera housing 63 can relatively turn around a first axis, which extends along the longitudinal direction of the arm 69, and around a second axis, which is orthogonal to the first axis, in an independent manner. The arm 69 has a flattened shape from the leading end thereof toward the vicinity of the base end (i.e., the other end in the longitudinal direction) thereof. The base end of the arm 69 is connected to the housing 25 via the cut 34 (see FIG. 2) and via the uniaxial hinge device 67 housed in the housing 25. With respect to the housing 25, the arm 69 can relatively turn around a third axis, which extends along the Y axis (see FIGS. 8 and 9). In between the camera housing 63 and the arm 69 is disposed a cover member 71 that partially covers the biaxial hinge device mentioned above.

In the following explanation, a unit that includes the camera housing 63 having the electronic camera 21 housed therein, includes the arm 69, and includes the biaxial hinge device mentioned above is referred to as an image input unit 24. The reference state of the image input unit 24 points to a state when the relative positions of the camera housing 63 and the arm 69 around the first axis and the second axis are as illustrated in FIGS. 2 and 7. In the reference state, the rear face (i.e., the top face in FIG. 2) of the image input unit 24 is flat in entirety.

Figure 8:
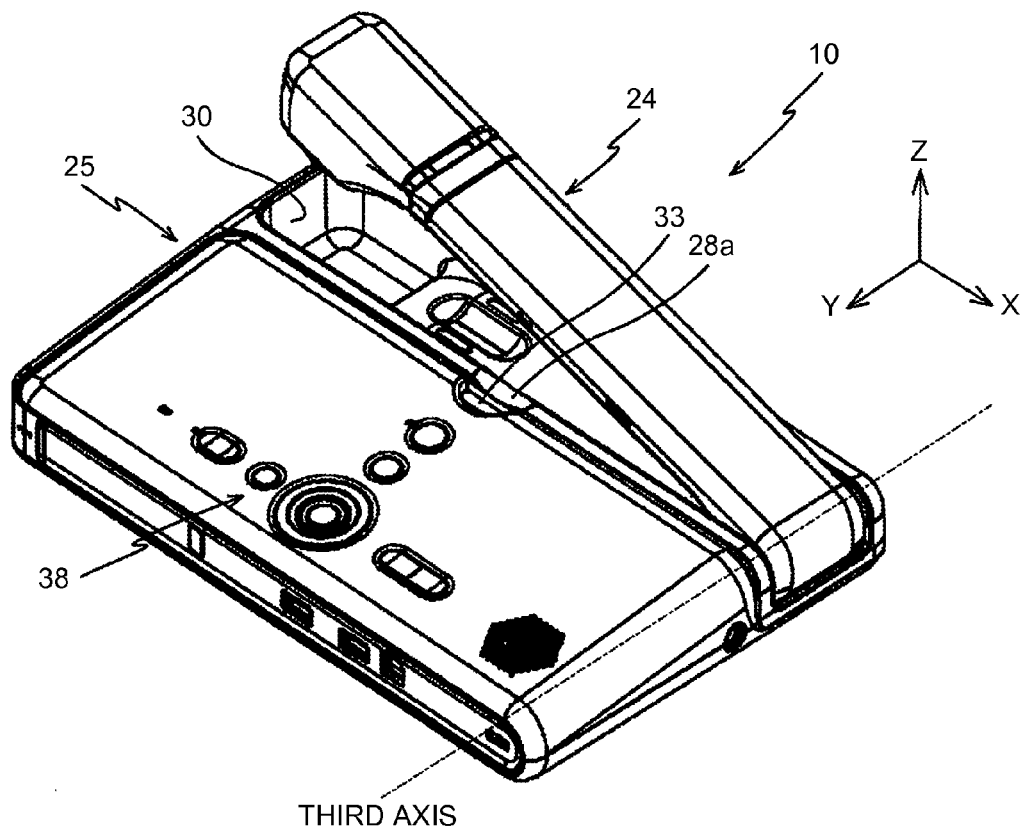
FIG. 8 is a diagram illustrating one state under the operations performed on the image input device according to the embodiment.
Figure 9:
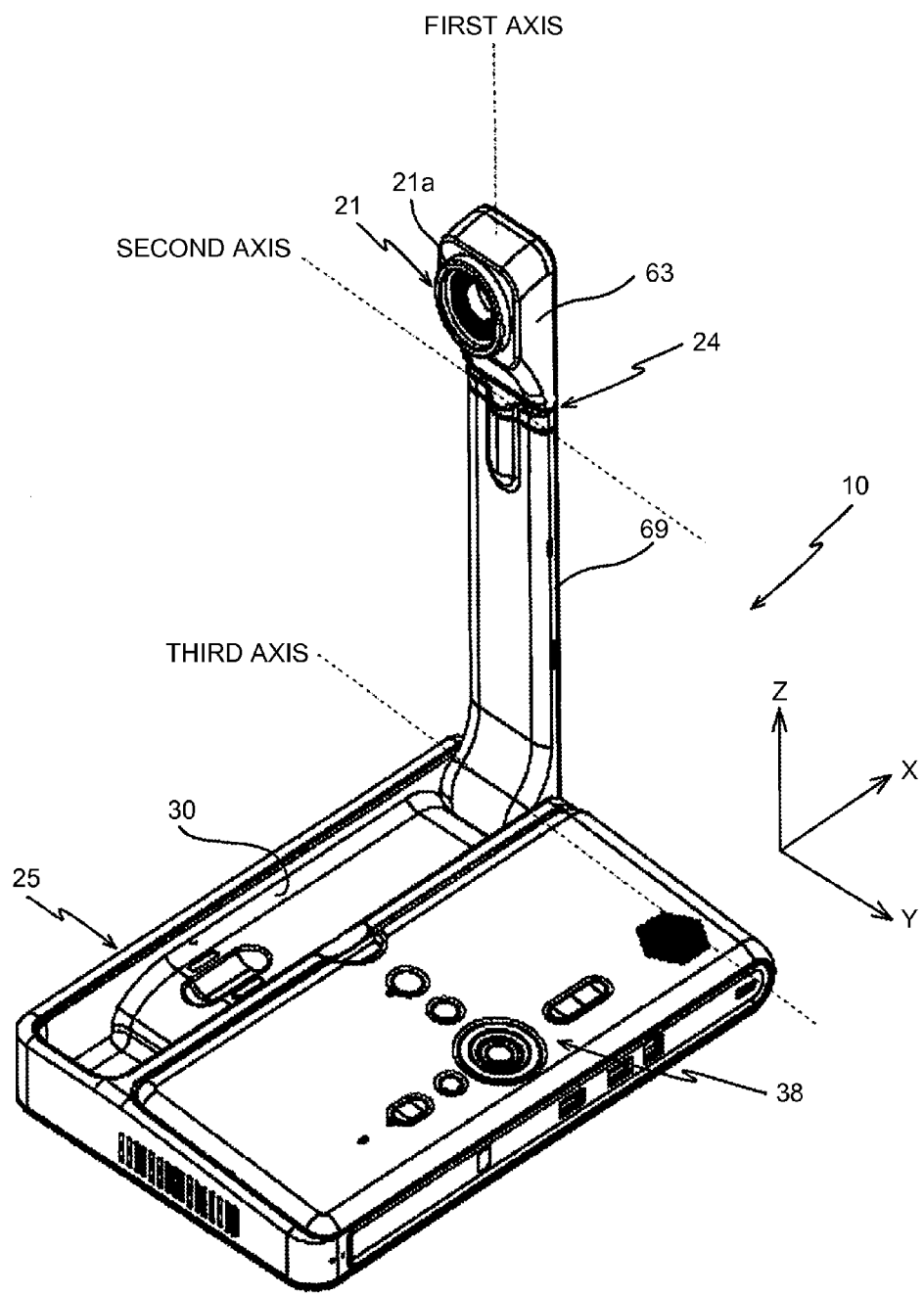
FIG. 9 is a diagram illustrating another state under the operations performed on the image input device according to the embodiment.

Due to the action of the uniaxial hinge device 67, the image input unit 24 can turn around the third axis between a housed position, at which the image input unit 24 is housed in the housing 25 via the concave portion 30 and the cut 34, and a projected position, at which the image input unit 24 projects to the outside of the housing 25 from the housed position (see FIGS. 8 and 9). If it is assumed that, when the image input unit 24 is at the housed position, the angle of turning thereof with respect to the housing 25 around the third axis is 0°; then the range of turning of the image input unit 24 is mechanically regulated, for example, from 0° to 135°.

Moreover, from the housed position, the image input unit 24 is kept biased toward the projected position by a biasing member (not illustrated) disposed in the uniaxial hinge device 67. When the image input unit 24 turns from the projected position to the housed position, a locking device 8 that includes a lock releasing button 33 (described later) mechanically locks the image input unit 24 with respect to the housing 25 at the housed position. When the lock releasing button 33 is operated (pressed), the locking device 8 unlocks the image input unit 24, which is placed at the housed position, with respect to the housing 25. Then, due to the action of the biasing member mentioned above, the image input unit 24 turns from the housed position toward the projected position by a predetermined angle (for example, 15°) (see FIG. 8). Thus, the uniaxial hinge device 67 has a function of popping up the image input unit 24 from the inside of the housing 25 with the action of the biasing member mentioned above (popup function).

Furthermore, due to the action of a holding torque generating device (not illustrated) disposed in the uniaxial hinge device 67, the image input unit 24 is held with respect to the housing 25 at an arbitrary position within a predetermined range (for example, at a position at which the abovementioned angle of turning is between 45° 135°, inclusive) around the third axis. When a required moment around the third axis is applied, the image input unit 24 that is held in the abovementioned manner turns around the third axis.

In the image input unit 24, due to the action of the holding torque generating unit (not illustrated) disposed in the biaxial hinge device mentioned above, the camera housing 63 is held with respect to the arm 69 at a predetermined position within predetermined ranges around the first axis and the second axis. When the required moments around the first axis and around the second axis are applied, the camera housing 63 that is held in the abovementioned manner turns around the first axis and around the second axis in an independent manner.

When a user holds the image input unit 24 with a hand and turns it with respect to the housing 25 around the third axis; then moments around, for example, the Y axis, the X axis, and the Z axis act on the housing 25 via the uniaxial hinge device 67. Consequently, depending on the position of the center of gravity of the portion excluding the image input unit 24 of the video teleconference device 10 (hereinafter, referred to as "main body") and depending on the ratio by weight between the image input unit 24 and the main body; there is a risk that the main body rattles when the user turns the image input unit 24 with respect to the housing 25.

In that regard, in the present embodiment, although not illustrated in diagrams, the constituent elements in the housing 25 are arranged in such a manner that the center of gravity of the main body is positioned in the vicinity of the center of the housing 25. Moreover, the ratio by weight between the image input unit 24 and the main body is set to, for example, 1:10.

As a result, when the user turns the image input unit 24 with respect to the housing 25, the main body is prevented from rattling. Thus, the user can turn the image input unit 24 with respect to the housing 25 around the third axis in a stable condition of the main body.

As illustrated in FIG. 4, at the time of positioning the image input unit 24, which is in the reference state, at the housed position; at least a part of the lower face of the image input unit 24 gets placed on the bottom face that defines the concave portion 30, and the rear face (top face) of the image input unit 24 lies at almost the same height as the end on the side in the –Y direction of the top face of the operation panel 36. As illustrated in FIG. 3, when placed at the housed position, the image input unit 24 almost fits in the concave portion 30 as far as the X-axis direction and the Y-axis direction are concerned.

Herein, in case the configuration is such that the operation panel 36 and the concave portion 30 are placed side-by-side on the upper wall of the housing 25 (i.e., the upper wall of the upper cover 27); then it becomes difficult for the user to easily identify, visually or tactually, the border between the image input unit 24 positioned at the housed position and the operation panel 36. As a result, the user cannot easily understand the orientation (particularly, the front-back direction) of the video teleconference device 10. That may make the user puzzled while installing the video teleconference device 10.

In that regard, in the present embodiment, as illustrated in FIGS. 4 and 5, in the area between the operation panel 36 and the concave portion 30 on the upper wall of the housing 25; a strip-like planar section 28 is formed that, along with the top face of the operation panel 36, forms a step portion 31 (identification portion).

Except some portion (a depression 28*a* (described later)), the entire area of the strip-like planar section 28 is a plane along the XY plane.

The strip-like planar section 28 is formed at a position that is at a slightly lower level (for example, lower by 1 mm to 5 mm, desirably lower by 3 mm) than the top face of the operation panel 36. Moreover, the strip-like planar section 28 continues with the top face of the operation panel via a gentle curved face 66 that projects in the oblique upward direction on the sides in the −Y direction and the +Z direction. Thus, because of the strip-like planar section 28, the top face of the operation panel 36, and the curved face 66; the step portion 31 is formed that extends over almost the entire area in the X-axis direction of the housing 25. Meanwhile, for example, the curved face 66 can also be made to project in the oblique downward direction on the sides in the +Y direction and the −Z direction.

As illustrated in FIG. 3, in a planar view, the strip-like planar section 28 extends over almost the entire area in the X-axis direction of the housing 25, and has an elongated external appearance with a uniform width in the Y-axis direction (around half of the width of a finger; for example, 5 mm to 15 mm, desirably 10 mm) and with the X-axis direction serving as the longitudinal direction.

At the center in the X-axis direction of the strip-like planar section 28, the depression 28a is formed that is open on the sides in the +Z direction, the +Y direction, and the −Y direction (see FIG. 8). The XZ cross-sectional shape of the face that defines the depression 28a has a substantially arc-like shape projecting downward. The size of the depression 28a is such that, for example, a finger can be placed thereon.

As illustrated in FIG. 4, the strip-like planar section 28 is formed at a position that is at a slightly lower level (for example, lower by 1 mm to 5 mm, desirably lower by 3 mm) than the top face (i.e., the rear face) of the image input unit 24 that is housed in the housing 25. Thus, because of the strip-like planar section 28, because of the top face of the image input unit 24 positioned at the housed position, and because of the angled faces on the sides in the +Y direction and the +Z direction of the image input unit 24 positioned at the housed position; a step portion 70 is formed that extends over almost the entire area in the X-axis direction of the upper wall of the housing 25.

With such a configuration, at least one of the step portions 31 and 70 enable the user to easily identify, visually or tactually, the border between the image input unit 24 positioned at the housed position and the operation panel 36.

Moreover, consider a case when the video teleconference device 10 is in the unused state (i.e., the state when the image input unit 24 is positioned at the housed position) and when, for example, the rear side portion of the video teleconference device 10, with the rear side portion (i.e., the portion on the side in the −Y direction) of the housing 25 pointing downward and the front side portion (i.e., the portion on the side in the +Y direction) of the housing 25 pointing upward, is held by the user in a hand and carried under the arm. In that case, at least the fingers of that hand or the back of that hand get engaged with the step portion 70. As a result, it becomes possible to stably (reliably) hold the video teleconference device 10 while carrying it.

Besides, in the state when the image input unit 24 is positioned at the housed position (i.e., in the unused state), the center of gravity of the video teleconference device 10 is positioned at the center of the housing 25, that is, positioned at the center of the housing 25 when viewed in a planar view and a side view. Thus, with respect to all of the X-axis direction, the Y-axis direction, and the Z-axis direction; the video teleconference device 10 has a good weight balance. As a result, while carrying the video teleconference device 10, the fingers or the wrist is not subjected to any extra strain.

Meanwhile, as illustrated in FIG. 4, with respect to the horizontal plane (i.e., the lower face of the housing 25), the operation panel 36 is tilted at, for example, 2° to 7° (desirably tilted at 4° to 5°) in such a way that the side in the +Y direction of the top face (i.e., the front side) of the operation panel 36 is at a lower level than the side in the −Y direction of the top face (i.e., the rear side) of the operation panel 36.

Hence, particularly when a user is positioned roughly on the side in the +Y direction (i.e., the front side) of the housing 25, excellent visibility and operability is achieved regarding a plurality of operating members mentioned above. Moreover, since the housing 25 has different thicknesses at the front side (i.e., on the side in the +Y direction) and the rear side (i.e., on the side in the −Y direction) (in other words, since the front side is thinner than the rear side), it becomes easier for the user to understand front-back orientation of the video teleconference device 10.

Figure 10:
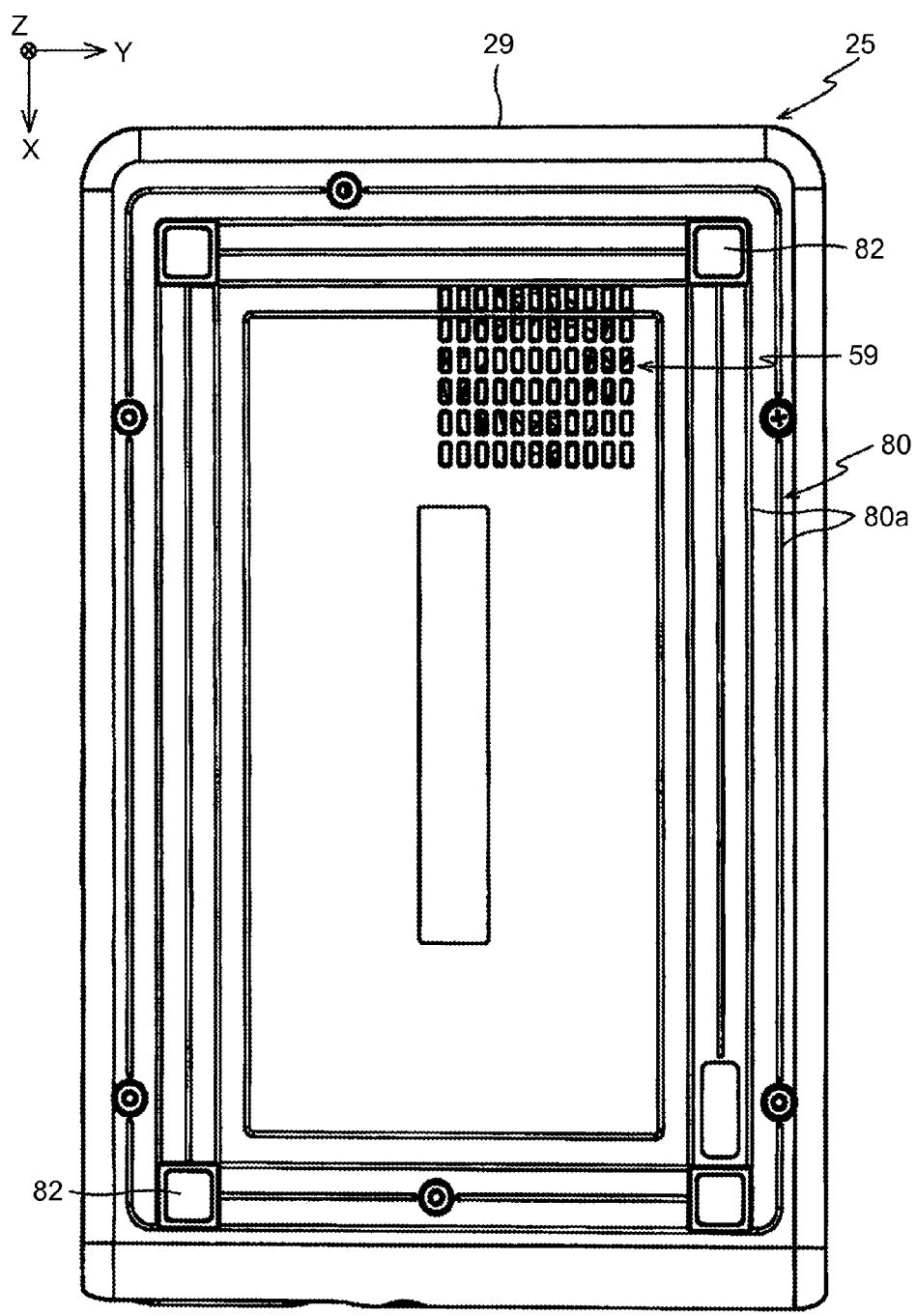
FIG. 10 is a bottom view of the video teleconference device according to the embodiment.

As illustrated in FIG. 10, on the lower face of the housing 25 (i.e., on the lower face of the lower cover 29), an elongated protrusion group 80 is formed that includes a plurality of (for example, five) narrow-width rectangular elongated protrusions (ridges) 80a, which extend along the outer circumference of the rectangular shape of the lower face of the housing 25 and which project downward.

More specifically, in the elongated protrusion group 80, when viewed from the −Z direction (from downward), a plurality of (for example, five) the rectangular elongated protrusions 80a having mutually different sizes are arranged at predetermined intervals in the area toward the outer circumference of the lower face of the housing 25 in such a manner that the rectangular elongated protrusions 80a on the outer side encircle the rectangular elongated protrusions 80a on the inner side.

The rectangular elongated protrusion 80a on the outermost side is formed at a position that is spaced apart from the end in the X-axis direction and the end in the Y-axis direction of lower face of the housing 25 by a distance of, for example, 10 mm to 15 mm. The distance between two adjacent rectangular elongated protrusions 80a is set to, for example, 4 mm to 8 mm (desirably, 6 mm).

As a result, for example, when the user holds the housing 25 with one hand, the balls of fingers of that hand get engaged with at least one of the rectangular elongated protrusions 80a. That makes it possible to grip the housing 25 with more reliability.

As described above, in addition to configuring the video teleconference device 10 to be compact and slim, many measures are taken so that it carried without difficulty. That enhances the design as far as portability is concerned.

When counted from the rectangular elongated protrusion 80a on the innermost circumference or the outermost circumference, the third rectangular elongated protrusion 80a as well as the fourth rectangular elongated protrusion 80a has its four corner portions segmentalized by insulators 82, which are attached at the four corners of the lower face of the housing 25 (i.e., the lower face of the lower cover 29) and which are made of a soft resin such as rubber or urethane.

The lower faces of the insulators 82 are positioned at a lower level (on the side in the −Z direction) than the lower face of the elongated protrusion group 80. As a result, when the housing 25 is placed on, for example, the top face (mounting face) of a desk or a table, at least three of the insulators 82 abut against the mounting face thereby preventing the elongated protrusion group 80 from abutting against the mounting face. With that, it becomes possible to soften the shock that occurs when the video teleconference device 10 is placed on the mounting face as well as to prevent the elongated protrusion group 80 and the mounting face from getting damaged.

Given below is the explanation regarding the operating unit 38. As described below in detail, the operating unit 38 includes a plurality of operating members that are arranged on the operation panel 36. Herein, for example, push buttons are used as the operating members included in the operating unit 38.

As illustrated in FIG. 3, at the center in the X-axis direction on the operation panel 36 and from the side in the −Y direction toward the side in the +Y direction; the lock releasing button 33, a Power button 35, a Line button 37, and an Enter button 39 are arranged in that order in a line in the Y-axis direction.

The lock releasing button 33 is an operating member used to release the lock (latch) that is applied to the image input unit 24 at the housed position by the locking device 8.

Figure 11:
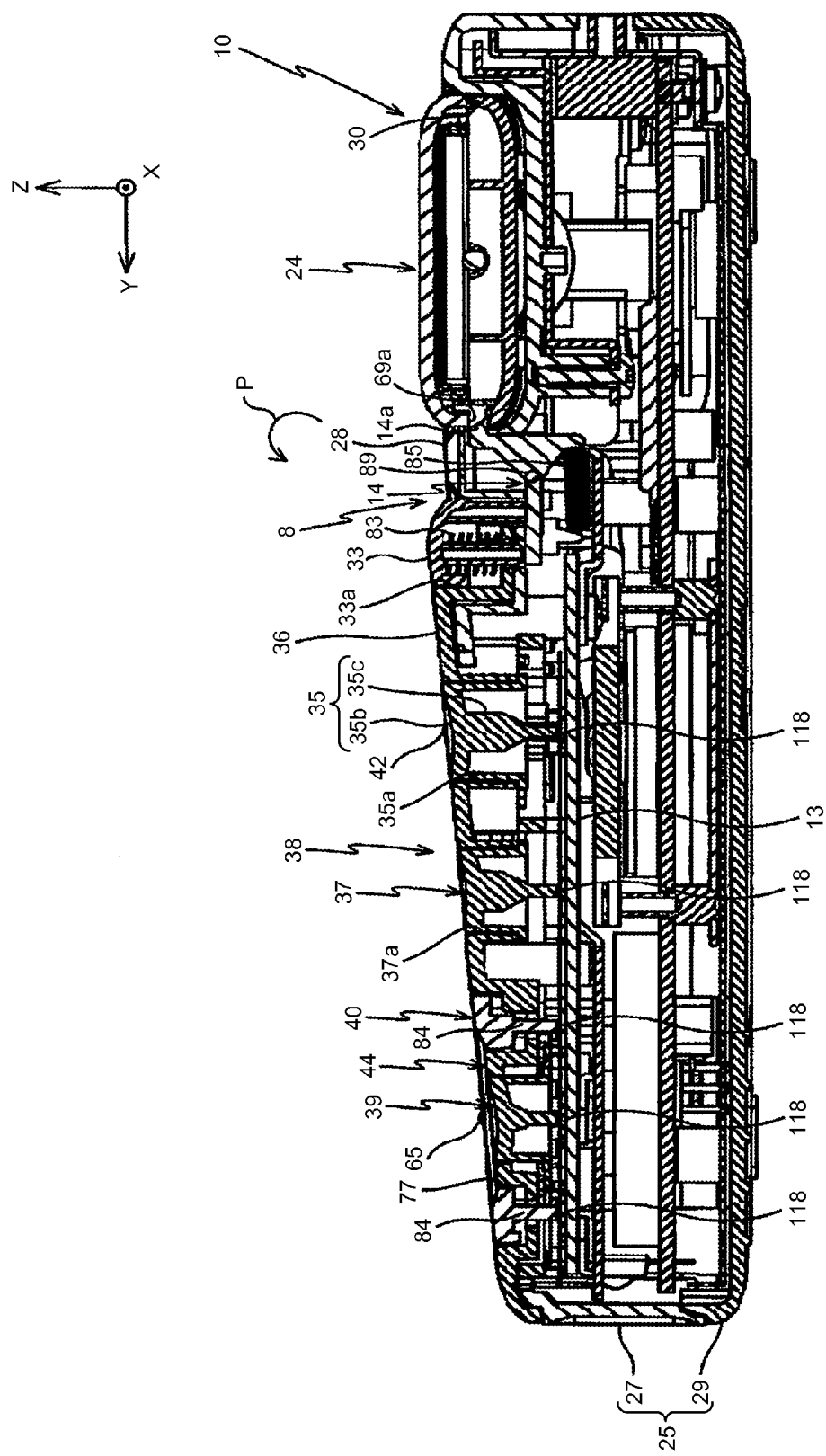
FIG. 11 is a cross-sectional view along line A-A illustrated in FIG. 3.

The top portion (i.e., a press portion) of the lock releasing button 33 is, for example, a semicircular portion when viewed in a planar view. With the diameter of the press portion oriented in the −Y direction, the lock releasing button 33 is inserted in a notch 33a, which is formed at a location adjoining the depression 28a in the operation panel 36 and which is slightly larger than the press portion, in a manner capable of doing an up-and-down motion with predetermined strokes. As illustrated in FIG. 11, the lock releasing button 33 is biased upward by, for example, a compression coil spring 83. When the lock releasing button 33 is not pressed downward, the top face thereof is positioned at almost the same height as the top face of the operation panel 36.

Meanwhile, in addition to the lock releasing button 33, the locking device 8 includes a locking member 14 that can turn around the X axis with a shaft 89 serving as the fulcrum point. The shaft 89 is supported by the housing 25 at a position downward of the strip-like planar section 28, and extends in the X-axis direction. Of the locking member 14, the portion on the side in the +Y direction of the shaft 89 abuts against the lower portion of the lock releasing button 33. Moreover, of the locking member 14, the portion on the sides in the −Y direction and the −Z direction of the shaft 89 is biased in the +Y direction by a helical extension spring 85. Furthermore, of the locking member 14, in the portion on the sides in the −Y direction and the +Z direction of the shaft 89, a locking claw 14a is formed that can get locked in a locking hole 69a formed on the side wall on the side in the +Y direction of the arm 69. The locking claw 14a is tilted in such a manner that the side on the −Y direction of the top face thereof is at a lower level than the side on the +Y direction of the top face thereof. As will be noted in FIG. 11, when the image input unit 24 is positioned at the housed position, the locking claw 14a enters inside the locking hole 69a (i.e., protrudes inside the concave portion 30). As a result, when at the housed position, the image input unit 24 is locked with respect to the housing 25.

When the image input unit 24 is positioned at the housed position and is locked with respect to the housing 25, the lock releasing button 33 opposes the elastic force of the compression coil spring 83 and the helical extension spring 85. When the lock releasing button 33 is pressed downward by a predetermined force, that is, when the lock releasing button 33 is pressed up to a position at which the top surface of the press portion of the lock releasing button 33 is at a lower level than the strip-like planar section 28 but higher than the face that defines the depression 28a; the locking member 14 turns (retracts) in one direction around the X axis (in a direction indicated by an arrow P illustrated in FIG. 11). With that, the locking hole 69a and the locking claw 14a are released from the locked state, that is, the image input unit 24 is released from the locked state with respect to the housing 25; and the image input unit 24 turns (pops up) toward the projected position from the housed position.

Herein, assume that the depression 28a is not formed in the strip-like planar section 28. In that case, if the lock releasing button 33 is pressed by a finger pointing toward the side in the −Y direction, there is a risk that the fingernail of that finger may get stuck in the strip-like planar section 28. In that regard, in the present embodiment, when the lock releasing button 33 is pressed by a finger pointing toward the side in the −Y direction, the leading end of that finger slides into the depression 28a (see FIG. 8). As a result, the risk of a fingernail getting stuck is averted.

Once the image input unit 24 pops up in the manner described above (see FIG. 8), when the downward pressing of the lock releasing button 33 is stopped, the locking member 14 returns to the original position (i.e., the position illustrated in FIG. 11) due to the action of the helical extension spring 85. There, if the image input unit 24 is turned toward the housed position from the projected position, then the arm 69 enters the concave portion 30 while pressing the locking claw 14a of the locking member 14 toward the +Y direction and making the locking member 14 turn (retract) in the direction of the arrow P illustrated in FIG. 11. Subsequently, when the locking hole 69a comes opposite to the locking claw 14a, the action of the helical extension spring 85 causes the locking claw 14a to enter the locking hole 69a, and the locking member 14 returns to the original position (i.e., the position illustrated in FIG. 11). In this way, at the housed position, the image input unit 24 gets locked with respect to the housing 25.

The Power button 35 is an operating member used to switch on or switch off the power supplied to the video teleconference device 10.

As illustrated in FIG. 11, the Power button 35 includes a press portion 35b, which has the shape resembling a stovepipe hat, and includes a pressing portion 35c, which protrudes downward from the lower face of the upper wall of the press portion 35b. The lower end portion of the pressing portion 35c is positioned downward that the flange of the press portion 35b.

The Power button 35 is inserted, from the lower side, in a circular opening 35a that is formed on the side in the +Y direction of the notch 33a formed on the operation panel 36, that is slightly larger than the portion excluding the flange of the press portion 35b (i.e., slightly larger than the minor diameter portion), and that is smaller than the flange of the press portion 35b (i.e., smaller than the major diameter portion). Thus, of the Power button 35, the minor diameter portion is inserted in the circular opening 35a and the major diameter portion (i.e., the flange) is positioned opposite to the rim (periphery) of the circular opening 35a formed on the lower face of the operation panel 36. Moreover, the Power button 35 is capable of doing an up-and-down motion with small strokes with respect to the operation panel 36. With that, the Power button 35 becomes capable of pressing the corresponding operating terminal 118 that is mounted on the sub-board 13 and that is positioned immediately beneath the pressing portion 35c.

Thus, when the Power button 35 (the press portion 35b) is pressed downward, the pressing portion 35c presses downward the corresponding operating terminal 118 mounted on the sub-board 13, thereby resulting in the switching on or the switching off of the power.

As illustrated in FIG. 3, at a location adjoining the Power button 35 disposed on the operation panel 36 (i.e., in the vicinity on the side in the −X direction of the Power button 35), a small confirmation lamp 42 is installed that lights on or goes out corresponding to the switching on or the switching off of the power, respectively.

The Line button 37 is an operating member that is used in disconnecting the Internet connection established with another device during two-way communication.

As illustrated in FIG. 11, the Line button 37 has the same configuration (including the attachment structure) as the Power button 35. The minor diameter portion of the Line button 37 is inserted in a circular opening 37a that is formed on the side in the +Y direction of the circular opening 35a. The major diameter portion of the Line button 37 is positioned opposite to the rim (periphery) of the circular opening 37a. Moreover, the Line button 37 is capable of doing an up-and-down motion with small strokes with respect to the operation panel 36. With that, the Line button 37 becomes capable of pressing the corresponding operating terminal 118 that is mounted on the sub-board 13 and that is positioned immediately beneath a pressing portion of the Line button 37.

Thus, when the Line button 37 is pressed downward, the pressing portion thereof presses downward the corresponding operating terminal 118 mounted on the sub-board 13. As a result, the communication with another device is cut off.

The Enter button 39 is an operating member for finalizing an item that is selected by means of an operation of a Cursor button 40 (described later) with respect to a menu screen displayed, for example, on the screen of a liquid crystal monitor or on a screen S using a projector P (see FIG. 14). The details regarding the Enter button 39 are given later.

As illustrated in FIG. 3, on the side in the +X direction of the Enter button 39 disposed on the operation panel 36, the pair of Volume buttons 41a and 41b is so arranged that the Volume buttons 41a and 41b are positioned adjoining to each other in the X-axis direction (the Volume button 41a is positioned on the side in the −X direction and the Volume button 41b is positioned on the side in the +X direction). Moreover, on the side in the −X direction of the Enter button 39 disposed on the operation panel 36, a Menu button 45 is disposed that serves as an operating member constituting the operating unit 38. Furthermore, on the side in the −X direction of the Menu button 45 disposed on the operation panel 36, the Microphone mute button 47 is disposed that serves as an operating member constituting the operating unit 38.

Thus, on the operation panel 36, in the vicinity of the end thereof on side in the +Y direction and from the side in the +X direction toward the side in the −X direction; the Volume button 41b, the Volume button 41a, the Enter button 39, the Menu button 45, and the Microphone mute button 47 are arranged in that order in a line in the X-axis direction.

Each Volume button in the pair of Volume buttons 41a and 41b serves as an operating member for adjusting the volume level output from the speaker 15a, and is positioned on the side in the −X direction of the voice discharging opening 43.

Moreover, except for the fact that each Volume button in the pair of Volume buttons 41a and 41b has the X-axis direction as the longitudinal direction in a planar view, the Volume buttons 41a and 41b have the same configuration (including the attachment structure) as the Power button 35 as illustrated in FIG. 12A. Thus, of the Volume buttons 41a and 41b, the portions excluding the respective flanges are inserted on the side in the +X direction and on the side in the −X direction in an opening 61, which extends in the X-axis direction and which is formed at a location on the side in the +X direction of the Enter button 39 disposed on the operation panel 36. The flanges of the Volume buttons 41a and 41b are positioned opposite to the rim (periphery) of the opening 61 at the lower face of the operation panel 36. Moreover, each of the Volume buttons 41a and 41b is capable of doing an up-and-down motion with small strokes with respect to the operation panel 36. With that, each of the Volume buttons 41a and 41b becomes capable of pressing the corresponding operating terminal 118 that is mounted on the sub-board 13 and that is positioned immediately beneath a pressing portion of the corresponding Volume button.

Thus, when any one of the Volume buttons 41a and 41b is pressed downward, the corresponding operating terminal 118 mounted on the sub-board 13 gets pressed and the volume level of the speaker 15a gets adjusted. More particularly, when one of the Volume buttons 41a and 41b is pressed downward, the volume level of the speaker 15a decreases; while when the other of the Volume buttons 41a and 41b is pressed downward, the volume level of the speaker 15a increases.

The Menu button 45 is an operating member used in calling a menu screen, for example, on the screen of a liquid crystal monitor or on the screen S.

As illustrated in FIG. 12A, the Menu button 45 has the same configuration (including the attachment structure) as the Power button 35. The minor diameter portion of the Menu button 45 is inserted in a circular opening 45a formed at a location on the side in the −X direction of the Enter button 39 disposed on the operation panel 36. The major diameter portion of the Menu button 45 is positioned opposite to the rim (periphery) of the circular opening 45a at the lower face of the operation panel 36. Moreover, the Menu button is capable of doing an up-and-down motion with small strokes with respect to the operation panel 36. With that, the Menu button 45 becomes capable of pressing the corresponding operating terminal 118 that is mounted on the sub-board 13 and that is positioned immediately beneath a pressing portion of the Menu button 45.

Thus, when the Menu button 45 is pressed downward, the pressing portion thereof presses downward the corresponding operating terminal 118 mounted on the sub-board 13. As a result, a menu screen gets displayed on the screen of a liquid crystal monitor or on the screen S. The selectable items present in the menu screen include, for example, the address of the video teleconference device with which two-way communication is to be performed.

The Microphone mute button 47 is an operating member used in switching between input/no input of voice from the microphone 17a.

Except for the point that the Microphone mute button 47 has the X-axis direction as the longitudinal direction in a planar view as illustrated in FIG. 3, the Microphone mute button 47 has the same configuration (including the attachment structure) as the Power button 35 as illustrated in FIG. 12A. Thus, of the Microphone mute button 47, the portion excluding the flange is inserted in a circular opening 47a formed at a location on the side in the −X direction of the circular opening 45a that is formed on the operation panel 36. The flange of the Microphone mute button 47 is positioned opposite to the rim (periphery) of the circular opening 47a at the lower face of the operation panel 36. Moreover, the Microphone mute button 47 is capable of doing an up-and-down motion with small strokes with respect to the operation panel 36. With that, the Microphone mute button 47 becomes capable of pressing the corresponding operating terminal 118 that is mounted on the sub-board 13 and that is positioned immediately beneath a pressing portion of the Microphone mute button 47.

Thus, when the Microphone mute button 47 is pressed downward, the pressing portion thereof presses downward the corresponding operating terminal 118 mounted on the sub-board 13, thereby resulting in switching between input/no input of voice from the microphone 17*a*.

As illustrated in FIG. 3, at a location adjoining the Microphone mute button 47 disposed on the operation panel 36 (i.e., in the vicinity on the side in the −X direction of the Microphone mute button 47), a small confirmation lamp 65 is installed that lights on or goes out corresponding to the switching on or the switching off of the microphone 17*a*, respectively.

As described above, when viewed in a planar view, the operating members, which constitute the operating unit 38 and which have unique functions, are arranged in a T-shaped manner (or in an inverse T-shaped manner) (see FIG. 3). Such an arrangement is excellent from design point of view. Moreover, as described above, the voice discharging opening 43 is formed on the side in the +X direction of the pair of Volume buttons 41*a* and 41*b*, that is, formed in the extended portion of the T-shape mentioned above. That fact contributes in further enhancing the design.

When not in a pressed state, each of the operating members mentioned above has the top face at almost the same level as the top face of the operation panel 36 (see FIGS. 11 and 12A). That contributes in enhancing the oneness of the external appearance (i.e., in enhancing the style). Besides, the operating members do not get in the way while carrying the video teleconference device 10.

The top face of each of the operating members mentioned above (excluding the lock releasing button 33) has a gentle curve with the central part being at a lower level than the outer circumference (see FIGS. 11 and 12A). As a result, it becomes easier to place the finger on the top face of each operating member, thereby enabling achieving an enhanced operability.

Moreover, the pair of Volume buttons 41*a* and 41*b* that is used in adjusting the volume level is positioned adjoining the voice discharging opening 43 (see FIG. 3). Such an arrangement is easy to understand for the user in a sensual way.

Furthermore, the Microphone mute button 47 and the Menu button 45, each of which is used in implementing a special function, are positioned adjoining to each other (see FIG. 3). Such an arrangement is easy to understand for the user in a sensual way.

The pair of Volume buttons 41*a* and 41*b* and the Microphone mute button 47 are so arranged that the Enter button 39, which is positioned farthest on the side in the +Y direction from among a plurality of operating members arranged in a line in the Y-axis direction at the center in the X-axis direction of the operation panel, is sandwiched therebetween in the X-axis direction. That is, the operating members that are used in implementing the mutually contradictory functions of volume level adjustment and sound deadening are disposed on the side in the +X direction and on the side in the −X direction of the center in the X-axis direction of the operation panel 36. Hence, the positional relationship between those operating members is easy to understand, thereby preventing a situation in which an attempt to operate one of those operating members mistakenly results in the operation of the other operating member.

As illustrated in FIG. 3, the Cursor button 40 is disposed along the outer circumference of the Enter button 39.

As illustrated in FIG. 12B, which illustrates a partially enlarged view of a region R of FIG. 12A, the Cursor button 40 includes a Cursor button main body 81, which is a substantially cylindrical portion that is disposed surrounding the Enter button 39 and that has the Z-axis direction as the direction of axis; and includes pressing members 84 that protrude downward from the lower face on the side in the +X direction of the Cursor button main body 81, from the lower face on the side in the −X direction of the Cursor button main body 81, from the lower face on the side in the +Y direction of the Cursor button main body 81, and from the lower face on the side in the −Y direction of the Cursor button main body 81.

As illustrated in FIG. 11, the Cursor button main body 81 is inserted in a circular opening 77 that is formed on the side in the +Y direction of the circular opening 37*a* formed on the operation panel 36 and that is slightly larger than the Cursor button main body 81.

As illustrated in FIG. 12, when the Cursor button main body 81 is not pressed downward, the top face of an outer circumference 81*a* of the Cursor button main body 81 is at almost the same level as the top face of the operation panel 36. Regarding an inner circumference 81*b* of the Cursor button main body 81, the outer circumference top edge thereof is positioned at the same height as the inner circumference top edge of the outer circumference 81*a*, and the top face of the inner circumference 81*b* is tilted to have the inner circumference side at a lower level than the outer circumference side.

When viewed in a planar view, the inner circumference 81*b* of the Cursor button main body 81 has, for example, 3/5-th of the width of the outer circumference 81*a* (for example, if the outer circumference 81*a* has the width of 5 mm, then the inner circumference 81*b* has the width of 3 mm).

As illustrated in FIGS. 11 and 12B, the lower end of each pressing member 84 is positioned immediately above the corresponding operating terminal 118. At the lower end of each pressing member 84, a locking piece 84*a* is formed that extends in the radial direction of the Cursor button main body 81 and that gets locked in the operation panel 36. With that, the Cursor button 40 is prevented from coming off in the upward direction.

Moreover, the Cursor button 40 can perform an up-and-down motion with small strokes and becomes capable of pressing the operating terminals 118 that are mounted on the sub-board 13 corresponding to the four pressing members 84 and that are positioned immediately beneath the four pressing members 84. More specifically, in the Cursor button 40, each pressing member 84 of the Cursor button main body 81 has a press portion that corresponds to one of the four operation terminals arranged in a cross-shape manner (see FIG. 2) in the X-axis direction and the Y-axis direction around the operating terminal 118 corresponding to the Enter button 39. When any one of the four press portions is pressed, the corresponding operating terminal 118 gets pressed. Accordingly, a selection display (a selection key) that is used for selecting an item on the menu screen mentioned above moves in any one of the left, right, upward, and downward directions.

As illustrated in FIG. 12B, the Enter button 39 has the same configuration as the Power button 35. In the Enter button 39, the minor diameter portion of a press portion 39*a* has a diameter equal to, for example, 12/5-th of the width of the outer circumference 81*a* of the Cursor button main body 81 (for example, if the outer circumference 81*a* has the width of 5 mm, then the minor diameter portion of the press portion 39*a* has the diameter of 12 mm).

In between the press portion 39*a* of the Enter button 39 and the Cursor button 40 is disposed a spacer 44 that resembles a stovepipe hat, that has a circular opening 44*a* formed on the upper wall, and that is fixed to the operation panel 36.

Thus, regarding the Enter button 39, the minor diameter portion of the press portion 39*a* is inserted from downward in the circular opening 44*a* that is formed on the spacer 44 and that has a slightly larger size than the minor diameter portion of the press portion 39*a*.

The top face of the spacer 44 is positioned at almost the same height as the inner circumference top edge of the inner circumference 81*b* of the Cursor button main body 81 and the outer circumference top edge of the minor diameter portion of the press portion 39*a*. The spacer 44 has the width equal to one third of the diameter of the Enter button (for example, if the diameter of the minor diameter portion of the press portion 39*a* is 12 mm, then the spacer 44 has the width of 4 mm).

The Enter button 39 can perform an up-and-down motion with small strokes and becomes capable of pressing the corresponding operating terminal 118 that is mounted on the sub-board 13 and that is positioned immediately beneath the press portion 39*a*.

Thus, when the Enter button 39 is pressed downward, a pressing portion 39*b* thereof presses downward the corresponding operating terminal 118 mounted on the sub-board 13. With that, the item selected in the menu screen mentioned above is finalized.

With the configuration described above, while operating the Cursor button 40; for example, if the inner circumference 81*b* of the Cursor button main body 81 is pressed by the leading end of a finger with the ball of that finger placed on the spacer 44, not only an excellent operability is achieved but also the Enter button 39 is prevented from being mistakenly pressed. Moreover, while operating the Enter button 39; since the top face of the press portion 39*a* has a downward curve, the finger can be neatly placed thereon (i.e., the operability is excellent). At the time of pressing the press portion 39*a* with the leading edge of the finger; since the ball of that finger is placed on the spacer 44, the Cursor button 40 is prevented from being mistakenly pressed.

Generally, a Cursor button and an Enter button have strongly-linked functions of selecting/finalizing the items in a menu screen. Hence, it is desirable to dispose the Cursor button and the Enter button adjacent to each other. On the other hand, there is a concern that an attempt to operate one of the Cursor button and the Enter button might mistakenly result in the operation of the other (erroneous operation). In that regard, in the present embodiment, by disposing the spacer 44 in between the Enter button 39 and the Cursor button 40, not only the operability of the Cursor button 40 is enhanced but also the erroneous operation is prevented.

Figure 13:
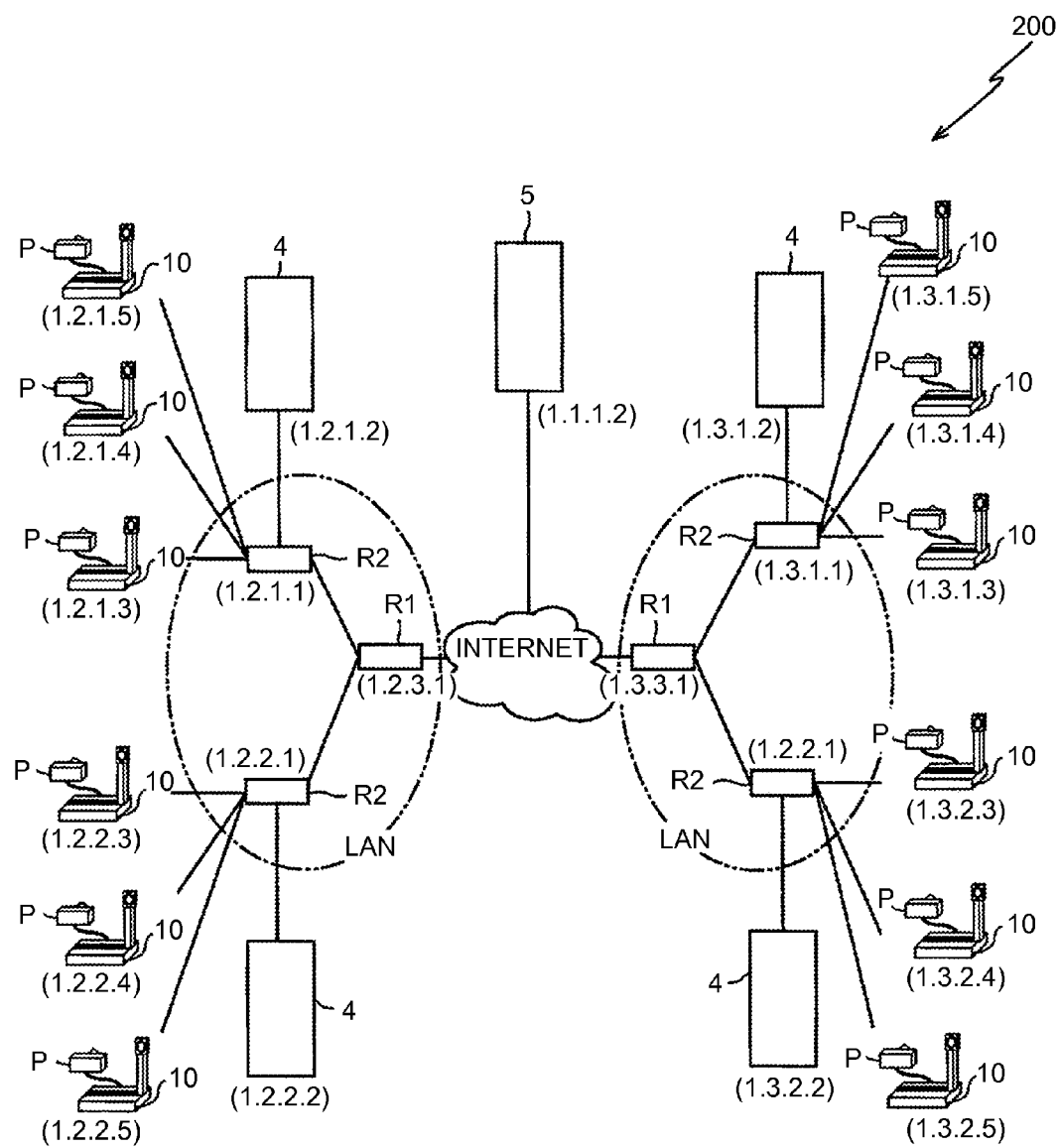
FIG. 13 is a diagram illustrating a configuration of a conference system including the video teleconference devices according to the embodiment.

Explained below with reference to FIG. 13 is a conference system 200 in which the video teleconference devices 10 are used. As illustrated in FIG. 13, the conference system 200 includes a LAN, which serves as a communication network having a plurality of (for example, two) end routers R1 connected to the Internet and a plurality of routers R2 connected to each router R1; includes a plurality (for example, three) of the video teleconference devices 10 connected to each router R2; includes relay devices 4 each connected to one of the routers R2; includes a communication managing device 5 connected to the Internet; and includes the projectors P each connected to one of the video teleconference devices 10.

The relay devices 4 are computers that implement various functions according to a predetermined computer program. The relay devices 4 constantly monitor the quality of the communication network (i.e., monitor the transmission rate) and set image data having suitable image resolution for that transmission rate. Thus, the relay devices 4 constantly detect whether, due to the effect of the communication network status or the processing status of the video teleconference devices 10, there is any mismatch (delay) between the image data and the voice data communicated among the video teleconference devices 10 during two-way communication. If any mismatch is occurring between the image data and the voice data; then the relay devices 4 select, from image data of high image resolution, image data of medium image resolution, and image data of low image resolution, the most suitable image resolution for the video teleconference device 10 suffering from the mismatch; and send that image resolution to the other video teleconference devices 10. Thus, even if the communication network declines in quality, the dynamic picture images can be communicated without interruption.

Moreover, in order to resolve the issue of a mismatch between the image data and the voice data, the relay devices 4 are not only capable of changing the image resolution as described above but also capable of changing the frame rate, or changing either the image resolution or the frame rate with the focus on the balance therebetween. The relay devices 4 with such functions constantly monitor the quality of the communication network (i.e., monitor the transmission rate) and manage the transmission of dynamic picture images and voice, that is, perform mismatch detection, image resolution settings, and the like.

The communication managing device 5 is a computer that manages all of the video teleconference devices 10 according to a predetermined computer program. More particularly, the communication managing device 5 manages the video teleconference devices 10 and the relay devices 4 in an integrated manner by means of comprehending the current operating state (such as a two-way communication state, a communication standby state, and a non-communicable state) of all of the video teleconference devices 10; performing device verification of the video teleconference devices 10; attaching an address list to the video teleconference devices 10 that have passed device verification; selecting the relay devices 4; and billing the two-way communication performed among the video teleconference devices 10.

Explained below is an example of a video teleconference session carried out by using the conference system 200 described above. Herein, it is assumed that the video teleconference session is carried out between a plurality of (for example, 12) groups, each having a plurality of members and each using a single video teleconference device 10. Thus, the following explanation is applicable to each of those groups.

Figure 14:
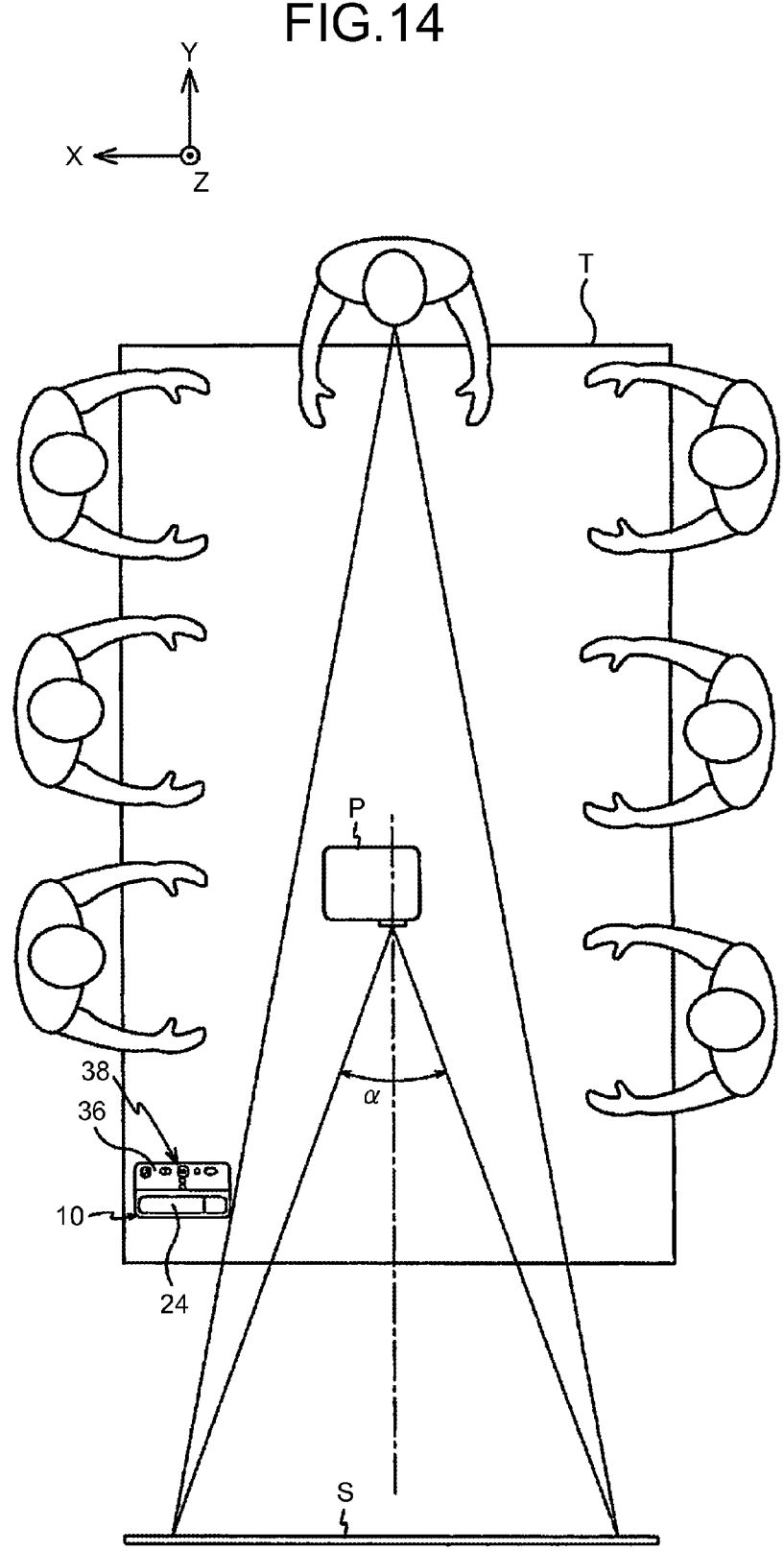
FIG. 14 is a diagram for explaining a video teleconference session carried out using the video teleconference devices according to the embodiment.

As illustrated in FIG. 14, a plurality of (for example, seven) members of a group are seated facing, for example, a table T, which has the shape of a planar rectangle with the Y-axis direction as the longitudinal direction and which is placed in a conference room. With respect to the table T, the members are seated on the side in the +X direction, on the side in the −X direction, and on the side in the +Y direction.

In the center of the table T is installed the projector P in such a manner that images can be projected on the screen S that is placed obliquely upward on the sides in the −Y direction and the +Z direction of the table T.

When the image input unit 24 is positioned at the housed position, the video teleconference device 10 is installed with such an orientation that, for example, at the corner between the sides in the +X direction and the side in the −Y direction of the table T (i.e., at a position that deviates from a horizontal angle of view a (roughly 20° to 40°) and that does not get in the way of viewing the images being projected on the screen S by the member seated at the position opposite to the screen S), the operation panel 36 (i.e., the front side) is positioned on the side in the +Y direction and the image input unit 24 (i.e., the rear side) is positioned on the side in the −Y direction.

In that case, in the video teleconference device 10, because of the step portions 31 and 70, the border between the image input unit 24 and the operation panel 36 is identifiable on the view (or with a touch). Moreover, in the housing 25, since the operation panel 36 has a forward tilt, the front-back orientation of the video teleconference device 10 is easy to understand. As a result, it becomes possible to adjust the video teleconference device 10 in the desired direction without difficulty.

In the video teleconference device 10 that is installed on the table T in the manner described above, the user positioned roughly on the side in the +Y direction (i.e., on the front side) of the video teleconference device 10 performs various operations using the operating unit 38. Thus, from the perspective of the user who is in charge of the operations, the operation panel 36 of the video teleconference device 10 is positioned on the near side and the image input unit 24 is positioned on the far side.

Meanwhile, along with the installation of the video teleconference device 10 in the abovementioned manner, the wiring of the video teleconference device 10 for electricity or communication (for example, wire connection of a terminal to be connected to the Internet with the LAN terminal 57 or wire connection of the image output terminal 55 with a terminal of the projector P) is also performed.

Subsequently, the user presses the lock releasing button 33 (see FIG. 3), which is disposed at the farthest position on the side in the −Y direction of the operation panel 36, and releases the lock of the image input unit 24 with respect to the housing 25. At that time, due to the popped up state of the uniaxial hinge device 67, the image input unit 24 turns around the third axis with respect to the housing 25 and then projects from the inside of the housing 25 by a predetermined amount (see FIG. 8).

There, the user holds the image input unit 24 in a hand and manually makes the image input unit 24 rotate around the third axis until the total angle of turning of the image input unit 24 reaches, for example, 90° (see FIG. 9), and manually makes the camera housing 63 appropriately turn around the first axis as well as around the second axis, so that the electronic camera 21 is positioned at the position at which, for example, all the members of that group are within the field of view of the electronic camera 21. In that case, since the arm 69 of the image input unit 24 has a flattened shape when viewed from roughly the side in the +Y direction (see FIG. 9), nothing particularly obstructs the view of all members of each group while viewing the screen S.

Herein, in the video teleconference device 10, the image input unit 24, which extends over almost the entire area in the longitudinal direction of the housing 25 and which has the electronic camera 21 attached to one end in the longitudinal direction, is connected via the uniaxial hinge device 67 to the housing 25 having the A4-size in a planar view. Thus, when the image input unit 24 is turned from the housed position around the third axis with respect to the housing 25 by, for example, 45° to 135°; the height of the electronic camera 21 can be exactly matched to the height at which the faces of the seated members of that group are positioned.

Then, a user presses the Power button 35 (see FIG. 3), which is disposed on the side in the +Y direction of the lock releasing button 33, and starts up the video teleconference device 10. In response, the video teleconference device 10 displays a menu screen on the screen S via the projector P. The menu screen contains icons or textual information representing various items regarding various adjustments or regarding the starting of a conference session (i.e., starting of two-way communication).

Subsequently, the user appropriately presses one of the four press portions of the Cursor button 40 and selects an item related to the starting of a conference session from the menu screen. That is followed by the pressing of the Enter button 39 so as to finalize the start of the conference session.

Once the start of the conference session is finalized, one video teleconference device 10 sends a signal notifying the start of the conference session to the communication managing device 5 via the communication network (such as a LAN or the Internet). In response, the communication managing device 5 performs device verification with respect to that video teleconference device 10 and, if verification is successful, sends to that video teleconference device 10 an address list containing the current operating states of a plurality of other video teleconference devices 10 (i.e., the video teleconference devices 10 registered in the communication managing device 5). Upon receiving the address list, the video teleconference device 10 displays it on the screen S via the projector P. The address list contains icon display and textual information that can be operated instinctively, and is appropriately updated.

Then, a user appropriately presses one of the four press portions of the Cursor button 40 and selects, from the address list, another video teleconference device 10 with which a video teleconference session is to be carried out. That is followed by the pressing of the Enter button 39 so as to finalize the other video teleconference device 10.

In this way, once the other video teleconference device 10 with which a video teleconference session is to be carried out is selected/finalized from among a plurality of other video teleconference devices 10 that are listed in the address list and that are not in a non-communicable state; the communication managing device 5 selects the most suitable relay device 4 from among a plurality of the relay devices 4. Usually, the relay device 4 that is physically close to the video teleconference device 10 under consideration is selected. However, if that relay device 4 is not functioning properly for some reason, then a different relay device 4 is selected. For example, as illustrated in FIG. 13, when the video teleconference device 10 under consideration has the Internet protocol (IP) address of (1.2.1.5), the relay device 4 having the IP address of (1.2.1.2) is selected. However, if that relay device 4 is not working, then the relay device 4 having the IP address of (1.2.2.2) is selected. Herein, for the sake of simplicity in the explanation, the IP addresses point to the unique IP addresses that are individually assigned to the video teleconference devices 10 (in FIG. 13, the IP addresses are illustrated by four numbers specified in brackets; for example, the communication managing device 5 has the IP address of (1.1.1.2)).

As soon as the communication managing device 5 selects the relay device 4, a request for two-way communication is sent via that relay device 4 to another video teleconference device 10 based on the IP address. Upon receiving the request for two-way communication, the other video teleconference device 10 displays items related to the acceptance and rejection of that request on the menu screen that has been projected on the screen S via the projector P.

There, the members of the other group operate the Cursor button 40 and the Enter button 39 of that other video teleconference device 10 so as to decide the item either related to the acceptance of the request or related to the rejection of the request. If the item related to the acceptance of the request is selected/finalized, two-way communication starts between the video teleconference device 10 that sent the request and the video teleconference device 10 that accepted the request.

At that time, as described above, the selected relay device 4 constantly monitors the quality of the communication network (i.e., monitors the transmission rate). If the quality of the communication network is found to have declined, then the relay device 4 performs a relay of changing the current image data to image data having a lower image resolution than the current image resolution, or performs a relay of changing the current image data to image data having a lower frame rate than the current frame rate, or performs a relay of changing the current image data to image data having a lower image resolution than the current image resolution and a lower frame rate than the current frame rate. At the time when two-way communication starts between two video teleconference devices 10, the communication managing device 5 performs operations, such as identification of those two video teleconference devices 10 and measuring the communication time period, that are related to the billing for the use of the conference system 200 according to the present embodiment.

As described above, when two-way communication starts between two video teleconference devices 10, the figures (images) of all members of the group captured by the electronic camera 21 of the first of the two video teleconference devices 10 are sent to the second video teleconference device 10, which is possessed by another group for communication, via the Internet and are projected on the screen S via the projector P connected to the second video teleconference device 10. Similarly, the figures (images) of all members of the group captured by the electronic camera 21 of the second video teleconference device 10 are sent to the first video teleconference device 10 via the Internet and are projected on the screen S via the projector P connected to the first video teleconference device 10.

Herein, the CPU 100 of each of the two video teleconference devices 10 makes use of a predetermined codec and encodes the images captured by the corresponding electronic camera 21 to obtain various image qualities such as the high-resolution image quality (for example, 640 pixels horizontally and 480 pixels vertically), the medium-resolution image quality (for example, 320 pixels horizontally and 240 pixels vertically), and the low-resolution image quality (for example, 160 pixels horizontally and 120 pixels vertically); and outputs the encoded image data. In each of the two video teleconference devices 10, such encoded image data can be decoded into moving images or into intermittent images (still images captured at fixed time intervals). Moreover, the option of selecting either moving images or intermittent images is made available from the corresponding menu screen. Besides, it is also possible to perform many different kinds of image expressions, such as the picture-in-picture function in which a plurality of sets of image data, which is obtained from a plurality of the video teleconference devices 10 possessed by other groups participating in a video teleconference session, is synthesized and simultaneously output.

Moreover, the voice of the group possessing the first video teleconference device 10 is input via the corresponding microphone 17a and is then transmitted to the second video teleconference device 10 via the Internet. In the second video teleconference device 10, the received voice is output from the corresponding speaker 15a. Similarly, the voice of the group possessing the second video teleconference device 10 is input via the corresponding microphone 17a and is then transmitted to the first video teleconference device 10 via the Internet. In the first video teleconference device 10, the received voice is output from the corresponding speaker 15a.

Before the start of a video teleconference session and during when the video teleconference session is going on, a user (a member of a group) appropriately presses the pair of Volume buttons 41a and 41b to adjust the volume level of the voice coming out of the speaker 15a, or appropriately presses the Microphone mute button 47 so as to prevent the voice of the own members from being output to the other groups. Besides, a user appropriately presses the Menu button 45 to call the menu screen on the screen S, and then performs the desired function by pressing the Cursor button 40 and the Enter button 39 to select/finalize items on the menu screen.

In this way, a video teleconference session is carried out by means of two-way communication of images and voice.

Meanwhile, in case the group at the other end of the communication is to be changed, the user presses the Line button 37 to cut off the Internet connection that is currently established with another video teleconference device 10. At that time, the menu screen is displayed on the screen S and the address list mentioned above is displayed in the menu screen.

Herein, in an identical manner to that described above, a user operates the Cursor button 40 and the Enter button 39 of the first video teleconference device 10, and selects/finalizes the video teleconference device 10 with which the next video teleconference session is to be carried out. Then, in the video teleconference device 10 that is selected/finalized, in an identical manner to that described above, when the operation of accepting two-way communication is performed, a two-way communication with the first video teleconference device 10 starts. Subsequently, the video teleconference session is carried out in an identical manner to that described above.

When the video teleconference session is over, a user presses the Power button 35 to cut off the power supply to the corresponding video teleconference device 10. In that case, the Power button 35 can be pressed after pressing the Line button 37 and cutting off the Internet connection with the other side of communication. Then, the user appropriately turns the camera housing 63 with respect to the arm 69 around the first axis and the second axis, and returns the image input unit 24 in the reference state. Then, the image input unit 24 in the reference state is turned around the third axis and housed in the housing 25. While being housed in the housing 25, the image input unit 24 gets locked with respect to the housing 25 due to the action of the locking device 8. Once the image input unit 24 is housed in the housing 25, the video teleconference device 10 looks almost like a flat plate of the A4 size when viewed in a planar view.

Meanwhile, for example, even if the projector P is replaced with a liquid crystal monitor or a liquid crystal television; a video teleconference session that is carried out using the conference system 200 described above can be performed in an identical manner to that described above.

While carrying out a video teleconference session in the manner described above, it turns out that the operating members of the operating unit 38 are used for mutually different number of times. That is, the operating member that is used for the least number of times is the lock releasing button 33 (used only once at the time of unlocking the image input unit 24), while the operating member that is used for the second least number of times is the Power button 35 (used twice at the time of supplying the power and cutting off the power). If the target device for communication is changed for three times or more, only then the Line button 37 may get used for three times or more.

Regarding the pair of Volume buttons 41*a* and 41*b*, the Microphone mute button 47, the Enter button 39, the Cursor button 40, and the Menu button 45; the number of times of usage varies in each video teleconference session. Thus, although cannot be categorically described, it can be said that those operating members are used for a greater number of times than the Line button 37.

For example, depending on the environmental sound (such as the presence of room air-conditioning or the surrounding noise) of the location at which the video teleconference device 10 is used, depending on the vocal volume of the members of the group on the other side of communication, and depending on the distance from the microphone 17*a*; there is variation in the volume level of the voice coming out of the speaker 15*a*. Accordingly, it becomes necessary to adjust the volume level coming out of the speaker 15*a*. As a result, by factoring in the potential of usage, it is inevitable that the pair of Volume buttons 41*a* and 41*b* are used for a greater number of times than the Line button 37.

Meanwhile, for example, during a video teleconference session, when there is a need to do a discussion (consultation) only within a group, then the microphone 17*a* of the corresponding video teleconference device 10 needs to be switched off by pressing the Microphone mute button 47 so that the details of that discussion are not leaked out to the group on the other side of communication. Such a case may occur frequently during, for example, business negotiations. Then, while resuming the talks with the other side of communication, the microphone 17*a* needs to be switched on by again pressing the Microphone mute button 47. Thus, by factoring in the potential of usage, it is inevitable that the Microphone mute button 47 is used for a greater number of times than the Line button 37.

During a video teleconference session, the Menu button 45 is pressed to call the menu screen, which would either replace the figures (images) from the other side of communication being displayed on the screen S or which would be displayed alongside those figures (images). Moreover, the Menu button 45 is also pressed to close the menu screen that has been called. By taking into consideration the fact that the menu screen displays various functions of the video teleconference device 10 and thus by factoring in the potential of usage, it is inevitable that the Menu button 45 is used for a greater number of times than the Line button 37.

The Enter button 39 and the Cursor button 40 are used to select/finalize various selection items projected on the screen S and to select/finalize the selection items displayed in the menu screen. Hence, by factoring in the potential of usage, it is inevitable that the Enter button 39 and the Cursor button 40 are used for a greater number of times than the Line button 37.

As described above, in order of the lock releasing button, the Power button 35, the Line button 37, and the Enter button 39; the potential frequency of usage, that is, the frequency of usage according to the function goes on increasing. As far as the Enter button 39, the pair of Volume buttons 41*a* and 41*b*, the Microphone mute button 47, the Menu button 45, and the Cursor button 40 are concerned; the potential frequency of usage, that is, the frequency of usage according to the function is about the same. Thus, each of the Enter button 39, the pair of Volume buttons 41*a* and 41*b*, the Microphone mute button 47, the Menu button 45, and the Cursor button 40 has a higher frequency of usage than the lock releasing button 33, the Power button 35, and the Line button 37. In the following explanation, regarding each operating member of the operating unit 38, the potential frequency of usage, that is, the frequency of usage according to the function is simply referred to as "frequency of usage".

As described above, in the video teleconference device 10 according to the present embodiment; in the operation panel 36, a plurality of (for example, five) operating members (such as the pair of Volume buttons 41*a* and 41*b*, the Enter button 39, the Menu button 45, and the Microphone mute button 47) are arranged in the X-axis direction. Moreover, a plurality of (for example, three) other operating members having lower frequencies of usage (such as the lock releasing button 33, the Power button 35, and the Line button 37) are arranged in the Y-axis direction along with one of the operating members mentioned earlier (for example, along with the Enter button 39).

Thus, the operating members having high frequencies of usage are arranged in a different line than the other operating members having low frequencies of usage, and the two lines of arrangement form an angle (for example, the right angle) with each other.

With such an arrangement, the positional relationship between the operating members having high frequencies of usage and the other operating members having low frequencies of usage is easy to understand (recognize), thereby enabling achieving enhancement in the user-friendliness. Particularly, during a video teleconference session, the operating members having high frequencies of usage are used frequently. In contrast, the operating members having low frequencies of usage are used only sporadically. Thus, since it is easy to understand the positional relationship between the operating members having high frequencies of usage and the other operating members having low frequencies of usage, a high degree of user-friendliness is achieved.

Moreover, in this case, the line in which the operating members having high frequencies of usage are arranged continues with the line in which the operating members having high frequencies of usage are arranged. That contributes in enhancing the oneness of the operating unit 38 (i.e., contributes in making the configuration of the operating unit 38 easy to understand), thereby enabling achieving enhancement in the user-friendliness.

Furthermore, in the present embodiment, the operating members having high frequencies of usage are arranged in a line in the X-axis direction on the foremost side (on the side in the +Y direction) of the operation panel 36. Thus, when viewed by a user positioned roughly on the side in the +Y direction of the video teleconference device 10), the operating members having high frequencies of usage are positioned within close reach (i.e., positioned on the near side), thereby enabling achieving enhancement in the user-friendliness.

Moreover, of the operating members having high frequencies of usage, the pair of Volume buttons 41*a* and 41*b* and the Microphone mute button 47 that have mutually contradictory functions are positioned on either side of the Enter button 39. That is, with respect to the line in which the other operating members having low frequencies of usage are arranged, the pair of Volume buttons 41*a* and 41*b* are positioned on the side in the +X direction and the Microphone mute button 47 is positioned on the side in the −X direction. As a result, the positional relationship between the pair of Volume buttons 41a and 41b and the Microphone mute button 47 becomes easy to understand, thereby enabling achieving enhancement in the user-friendliness. Thus, a situation is prevented in which the pair of Volume buttons 41a and 41b is mistakenly pressed for the Microphone mute button 47, and vice versa. Meanwhile, the voice discharging opening 43 that is used in voice outputting is formed on the side in the +X direction of the pair of Volume buttons 41a and 41b disposed on the operation panel 36. Such an arrangement also makes it easy to understand the positional relationship between the pair of Volume buttons 41a and 41b and the Microphone mute button 47.

Besides, of the operating members positioned on the foremost side (on the side in the +Y direction) of the operation panel 36, the Menu button 45 and the Microphone mute button 47 that are related to special functions are positioned adjoining to each other, thereby enabling achieving enhancement in the user-friendliness.

Moreover, as described above, in the present embodiment, the operating members having high frequencies of usage are arranged in a different line than the other operating members having low frequencies of usage, and the two lines of arrangement form an angle (for example, right angle) with each other. That prevents a situation in which an attempt to operate one of the operating members having high frequencies of usage mistakenly results in the operation of one of the operating members having low frequencies of usage, and vice versa.

Thus, it becomes possible to effectively prevent erroneous operations (erroneous pressing) among the operating members having high frequencies of usage and the operating members having low frequencies of usage. By extension, a function other than the desired function is prevented from being implemented. Particularly, during a video teleconference session, since the operating members that have high frequencies of usage and that are positioned on the foremost side (on the side in the +Y direction) are operated for the most part, a dramatic decrease can be achieved in the risk of erroneous operations of the operating members having low frequencies of usage.

While attempting to operate one of the operating members having high frequencies of usage; if a user mistakenly operates one of the operating members having low frequencies of usage, then the corresponding function may get implemented thereby forcing a recovery operation for recovering the device to the state prior to the implementation of that function.

For example, during a video teleconference session, while attempting to operate one of the operating members having high frequencies of usage; if the Line button 37 having a low frequency of usage is mistakenly pressed, then the Internet connection is cut off. That forces the user to reestablish the Internet connection with the other side of communication. Similarly, during a video teleconference session, while attempting to operate one of the operating members having high frequencies of usage; if the Power button 35 having a low frequency of usage is mistakenly pressed, the user has to again press the Power button 35 to restart the video teleconference device 10 and also has to reestablish the Internet connection.

In the present embodiment, as described above, it becomes possible to effectively prevent erroneous operations (erroneous pressing) among the operating members having high frequencies of usage and the operating members having low frequencies of usage. Because of that, the probability of a situation of having to perform the recovery operation can be reduced and, by extension, a video teleconference session (including preparation and clearance) can be expected to go on smoothly.

Meanwhile, the operating members having low frequencies of usage have mutually different frequencies of usage and are arranged in the Y-axis direction in such a manner that the operating member having the lowest frequency of usage is positioned farthest from the operating member having a high frequency (i.e., farthest from the Enter button 39). Thus, lower the frequency of usage of an operating member, the more it is arranged on the rear side (i.e., on the side in the −Y direction) of the operation panel 36. When viewed by a user positioned roughly on the side in the +Y direction of the video teleconference device 10; lower the frequency of usage of an operating member, the farther it is positioned from the line in which the operating members having high frequencies of usage are arranged. That enables achieving reduction in the possibility of erroneous operations. As a result, it becomes possible to effectively prevent erroneous operations (erroneous pressing) among the operating members having high frequencies of usage and the operating members having low frequencies of usage. By extension, a function other than the desired function is further prevented from being implemented (i.e., the probability of a situation of having to perform the recovery operation can be further reduced). To put it the other way around, when viewed by a user positioned roughly on the side in the +Y direction of the video teleconference device 10; higher the frequency of usage of an operating member, the closer it is positioned in the line in which the operating members having high frequencies of usage are arranged. That enhances the user-friendliness.

Besides, in the present embodiment, on the operation panel 36, the operating members having high frequencies of usage are arranged in the direction parallel to the lateral face on the side in the +Y direction (i.e., arranged in the X-axis direction) of the housing 25, while the operating members having low frequencies of usage are arranged in the direction parallel to the lateral face on the side in the +X direction (i.e., arranged in the Y-axis direction) of the housing 25. Overall, the operating members having high frequencies of usage and the operating members having low frequencies of usage arranged in a T-shaped manner or in an inverse T-shaped manner (i.e., arranged in a T-shaped manner or in an inverse T-shaped manner in which one side of "T" is parallel to the lateral face on the side in the +Y direction of the housing 25 and the other side of "T" is parallel to the lateral face on the side in the +X direction of the housing 25). That enhances the design of the operating unit 38.

In addition, the operating members having low frequencies of usage are arranged in a line in the Y-axis direction at the center in the X-axis direction of the operation panel 36, while the operating members having high frequencies of usage are arranged within equidistant ranges on the side in the +X direction and on the side in the −X direction from the center in the X-axis direction of the operation panel 36 (i.e., the distance from the operation panel 36 to the end in the +X direction of the Volume button 41b positioned on the side in the +X direction is same as the distance from the operation panel 36 to the end in the −X direction of the Microphone mute button 47). That enhances the balance of the arrangement in the operating unit 38.

As described above, in the present embodiment, the Enter button 39 is disposed at the end on the side in the +Y direction of the center in the X-axis direction of the operation panel 36. On the side in the −Y direction of the Enter button 39, the operating members having low frequencies of usage are arranged in the Y-axis direction. At that time, lower the frequency of usage of an operating member, the farther it is positioned from the Enter button 39. Moreover, the operating members having different functions or the operating members used for different operating purposes are disposed on the side in the +X direction and on the side in the −X direction of the Enter button 39 in a divided manner. That enables achieving enhancement in the user-friendliness.

Thus, in the video teleconference device 10 according to the present embodiment, the operating unit 38 including a plurality of operating members has excellent user-friendliness as well as excellent design. Moreover, among the operating members having high frequencies of usage and the operating members having low frequencies of usage, erroneous operations (particularly, careless operation of an operating member having a low frequency of usage (such as, particularly, the Power button 35 or the Line button 37)) are prevented as much as possible.

Meanwhile, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. For example, regarding the operating members included in the operating unit according to the present embodiment; the shapes, the number, the types (functions), and the arrangement are only exemplary and not limited to the description given above.

For example, in between the pair of Volume buttons 41a and 41b and the voice discharging opening 43 or in between the pair of Volume buttons 41a and 41b and the Enter button 39, a mute button (serving as an operating member) can be additionally disposed to enable deadening of the sound coming out of the speaker 15a.

In the present embodiment, there are five operating members that have high frequencies of usage and that are positioned in the X-axis direction on the operation panel 36. However, as long as a plurality of operating members is disposed, any number of such operating members can be used.

In the present embodiment, there are three operating members that have low frequencies of usage and that are positioned in the Y-axis direction on the operation panel 36. However, it serves the purpose to have at least one such operating member.

In the present embodiment, the operating members included in the operating unit 38 are assumed to be push buttons. However, alternatively, at least one of the operating members included in the operating unit 38 can be, for example, a touch-sensitive switch or a sliding switch.

In the present embodiment, the line in which the operating members having high frequencies of usage are arranged forms the right angle (90°) with the line in which the other operating members having low frequencies of usage are arranged. However, alternatively, the two lines of arrangement can also form an angle other than the right angle, such as an angle of 30°, 45°, or 60°. In that case, the line in which the operating members having high frequencies of usage are arranged can form the right angle with the X-axis and the line in which the operating members having low frequencies of usage are arranged can form the right angle with the Y-axis.

In the present embodiment, when viewed in a planar view, the operating members constituting the operating unit 38 are arranged in a T-shaped manner (or in an inverse T-shaped manner). However, alternatively, when viewed in a planar view, the operating members constituting the operating unit 38 can be arranged in a cross-shape manner, an L-shaped manner, an X-shaped manner, or a V-shaped manner. In short, the line of the operating members having high frequencies of usage and the line of the operating members having low frequencies of usage can be arranged to form an angle with each other. Moreover, particularly in the case of an L-shaped arrangement, it is desirable that the operating members having high frequencies of usage are arranged in a line in the X-axis direction on the farthest side in the +Y direction (i.e., on the front side); and it is desirable that, on the side in the −Y direction of the operating member having a high frequency disposed on the farthest side in the +X direction or on the farthest side in the −X direction, the operating member having low frequencies of usage are arranged in a line in the Y-axis direction in such a way that the frequency of usage of those operating members goes on decreasing from the side in the +Y direction toward the side in the −Y direction.

In the present embodiment, the pair of Volume buttons 41a and 41b is disposed on the side in the +X direction of the Enter button 39, while the Microphone mute button 47 is disposed on the side in the −X direction of the Enter button 39. However, alternatively, the arrangement can also be reversed. In that case, for example, the Menu button 45 either can be disposed adjoining the pair of Volume buttons 41a and 41b on the side in the +X direction or on the side in the −X direction, or can be disposed adjoining the Microphone mute button 47 on the side in the +X direction or on the side in the −X direction. Moreover, in this case, it is desirable that the voice discharging opening 43 is disposed adjoining the pair of Volume buttons 41a and 41b on the side in the +X direction or on the side in the −X direction. However, in this case, the voice output device 15 equipped with the speaker 15a needs to be disposed at a location corresponding to the voice discharging opening 43.

In the present embodiment, the Cursor button 40 is disposed surrounding the Enter button 39. Alternatively, for example, an operating member having a cross-shape, a T-shape, or an L-shape (in which portions corresponding to the left, right, upward, and downward directions can be integrated or separated) can be used as a Cursor button, and that Cursor button can be disposed adjoining the Enter button 39 either on the side in the +X direction, or on the side in the −X direction, or on the side in the −Y direction.

In the present embodiment, in the area between the operation panel 36 and the concave portion 30 formed on the housing 25, the step portion 31 is formed that serves as an identification portion. Alternatively, in the area between the operation panel 36 and the concave portion 30 formed on the housing 25, a protrusion can be formed as an identification portion that extends in the X-axis direction and that protrudes upward from the top face of the operation panel 36. In this case, the protrusion can either be formed over the entire area in the X-axis direction of the operation panel 36 or be formed partially over at least a single area in the X-axis direction of the operation panel 36. In this case, the protrusion not only serves as an identification portion but also serves as an engagement portion on which fingers get engaged while holding the video teleconference device 10 with the portion on the side in the −Y direction (rear side) facing downward.

In the present embodiment, in the area between the operation panel 36 and the concave portion 30 formed on the housing 25, the step portion 31 is formed that serves as an identification portion. In place of the step portion 31 or in addition to the step portion 31; for example, in the area between the operation panel 36 and the concave portion 30 formed on the housing 25 (for example, in the strip-like planar section 28), a different color can be applied that is different than the color of at least one of the operation panel 36 and the image input unit 24; or a different material can be used that is different than the material of at least one of the operation panel 36 and the image input unit 24; or predetermined characters, numbers, symbols, and designs can be written. In short, an identification portion can be formed that enables identification, by at least one of visually and tactually, of the border between the operation panel 36 and the image input unit 24 that is housed in the concave portion 30.

In the present embodiment, the step portion 31 is formed as a single identification unit over almost the entire area in the X-axis direction on the upper wall of the housing 25. However, as long as at least one step portion 31 is formed partially, it serves the purpose.

In the present embodiment, on the lower face of the housing 25, the elongated protrusion group 80 is formed that includes five rectangular elongated protrusions 80a. However, the rectangular elongated protrusions 80a constituting the elongated protrusion group 80 either can be less than five in number or can be six or more in number.

In the present embodiment, the elongated protrusions extend along the whole circumference (entire area of the outer circumference) of the lower face of the housing 25. However, alternatively, the purpose is also served when at least a single elongated protrusion is formed along a part of the outer circumference of the lower face of the housing 25.

In the present embodiment, the elongated protrusions are formed on the lower face of the housing 25. Alternatively, for example, the purpose is also served when at least a single elongated depression is formed along at least a part of the outer circumference of the lower face of the housing 25.

In the present embodiment, the housing 25 is rectangular in shape in a planar view. Alternatively, for example, in a planar view, the housing 25 can also be formed in a polygonal shape (excluding the rectangular shape), a round shape, in an elliptical shape.

In the present embodiment, the housing 25 is made of a substantially rectangular parallelepiped member. Alternatively, for example, the housing 25 can be made of a cubic member, a columnar member, or an elliptic cylindrical member. In short, the housing 25 can be made of a member having an upper wall.

In the present embodiment, the video teleconference device 10 is used, for example, in a conference room. However, that is not the only possible case. As described above, the video teleconference device 10 is configured to be compact and slim with excellent portability. Hence, the video teleconference device 10 is not confined to be stationary in a specific conference room, but can be expected to be freely carried around and used at various locations. Thus, the video teleconference device 10 is extremely rich in the utility factor.

In the present embodiment, the present invention is implemented in the video teleconference device 10 of a portable type. In addition, the present invention can also be implemented in the video teleconference device of a stationary type.

Meanwhile, if the video teleconference device program used in the video teleconference device 10 according to the present embodiment is made to be equivalent to a software-based program that makes use of a computer, then it becomes possible to build a conference system in which the relay device 4 and the communication managing device 5 become redundant (i.e., to build a configuration system using only a local area network (LAN) or a wide area network (WAN)). In this way, the video teleconference device 10 according to the present embodiment is not confined to be used in building the conference system 200 described above.

In the present embodiment, as an example of a video teleconference device, the explanation is given for the video teleconference device 10 that enables two-way communication (transmission and reception) of images and voice. However, that is not the only possible case, and the present invention can also be applied to a device (such as a telephone conference device) that enables transmission and reception of only either one of images and voice.

According to the embodiment, it becomes possible to provide a video teleconference device that includes an operating unit with excellent user-friendliness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
a housing; and
an operating unit provided on a tilted surface of the housing that is tilted relative to a bottom surface of the housing, the operating unit including a first operating member, a second operating member, and a spacer disposed in between the first operating member and the second operating member,
wherein the second operating member seamlessly surrounds the first operating member, and
the spacer is separate from and fixed to the housing while abutting each of the first operating member and the second operating member without being fixed to either of the first operating member and the second operating member, and
the spacer has different heights depending on a height of the tilted surface.

2. The apparatus according to claim 1, wherein the first operating member and the second operating member differ in function.

3. The apparatus according to claim 1, wherein the spacer is disposed so as to surround the first operating member.

4. The apparatus according to claim 3, wherein the spacer has a cylindrical portion.

5. The apparatus according to claim 3, wherein the first operating member is inserted in the spacer from a bottom of the spacer.

6. The apparatus according to claim 1, wherein the second operating member is disposed so as to surround spacer.

7. The apparatus according to claim 6, wherein the second operating member has a cylindrical portion.

8. The apparatus according to claim 7, wherein the cylindrical portion has a top face of an outer circumference thereof higher than a top face of the spacer and has a top face of an inner circumference thereof tilted to be lower in height toward the spacer.

9. The apparatus according to claim 1, wherein apparatus is a conference device configured to transmit and receive at least one of images and voice via a communication network.

* * * * *